United States Patent
Baek et al.

(10) Patent No.: US 12,099,135 B2
(45) Date of Patent: Sep. 24, 2024

(54) POSITIONING METHOD IN WIRELESS COMMUNICATION SYSTEM, AND DEVICE THEREFOR

(71) Applicant: LG ELECTRONICS INC., Seoul (KR)

(72) Inventors: Jongseob Baek, Seoul (KR); Woosuk Ko, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/766,515

(22) PCT Filed: Oct. 15, 2020

(86) PCT No.: PCT/KR2020/014116
§ 371 (c)(1),
(2) Date: Apr. 4, 2022

(87) PCT Pub. No.: WO2021/075884
PCT Pub. Date: Apr. 22, 2021

(65) Prior Publication Data
US 2024/0069148 A1    Feb. 29, 2024

(30) Foreign Application Priority Data

Oct. 15, 2019  (KR) .................. 10-2019-0127433
Oct. 15, 2019  (KR) .................. 10-2019-0127554
Oct. 28, 2019  (KR) .................. 10-2019-0134396

(51) Int. Cl.
*G01S 5/14*          (2006.01)
*G01S 5/02*          (2010.01)

(52) U.S. Cl.
CPC .............. *G01S 5/14* (2013.01); *G01S 5/0284* (2013.01)

(58) Field of Classification Search
CPC ................................. G01S 5/14; G01S 5/0284
(Continued)

(56) References Cited

U.S. PATENT DOCUMENTS

2011/0280235 A1   11/2011  Tiwari
2012/0021687 A1    1/2012  Parker
(Continued)

FOREIGN PATENT DOCUMENTS

| CN | 104198991 A | * 12/2014 | ............... G01S 5/06 |
| KR | 1020170129377 A | 11/2017 | |

(Continued)

OTHER PUBLICATIONS

XP033378446: Liu et al., Tsinghau National Laboratory for Information Science and Technology, Department of Electronic Engineering, Tsinghau University, "UAV-Aided High-Accuracy Relative Localization of Ground Vehicles," 2018 IEEE, (6 Pages).

(Continued)

*Primary Examiner* — Harry K Liu
(74) *Attorney, Agent, or Firm* — BRYAN CAVE LEIGHTON PAISNER LLP

(57) ABSTRACT

The present disclosure relates to a terminal-based positioning method and device and, the terminal-based positioning method performed by a terminal in a wireless communication system, according to one aspect, can comprise the steps of: measuring a time difference of arrival (TDoA) for each distributed antenna on the basis of signals received from an anchor node through a plurality of distributed antennas; setting the relative position for each distributed antenna on the basis of a reference point preset in correspondence with the terminal; and determining an absolute position, which is the position of the reference point, on the basis of the TDoA measured for each distributed antenna and the relative position set for each distributed antenna.

11 Claims, 22 Drawing Sheets

(58) Field of Classification Search
USPC .......................................................... 342/463
See application file for complete search history.

(56) References Cited

U.S. PATENT DOCUMENTS

| | | | |
|---|---|---|---|
| 2015/0339823 A1 | 11/2015 | Siomina | |
| 2016/0095080 A1 | 3/2016 | Khoryaev et al. | |
| 2017/0370678 A1* | 12/2017 | Holder | G01S 13/66 |
| 2018/0295470 A1 | 10/2018 | Markhovsky et al. | |

FOREIGN PATENT DOCUMENTS

| | | |
|---|---|---|
| KR | 10-2019-0116453 A | 10/2019 |
| WO | 2012016355 A1 | 2/2012 |
| WO | 2018169659 A1 | 9/2018 |
| WO | 2019143437 A1 | 7/2019 |

OTHER PUBLICATIONS

XP011687021A: Xue et al., IEEE Access, Special Section on Towards Service-Centric Internet of Things (IOT): From Modeling to Practice, "A Model on Indoor Localization System Based on the Time Difference Without Synchronization," vol. 6, 2018, (pp. 34179-34189).

XP51776002, S1-192412: Fraunhofer IIS, 3GPP TSG-SA WG1 Meeting #87, Sophia Antipoles, France, Aug. 19-23, 2019, "Definition of absolute and relative positioning," (4 Pages).

* cited by examiner (a)

(b)

(a)

(b)

● Distributed antenna
■ Reference point

POSITIONING METHOD IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/014116, filed on Oct. 15, 2020, which claims the benefit of KR Patent Application No. 10-2019-0134396 filed on Oct. 28, 2019, KR Patent Application No. 10-2019-0127554 filed on Oct. 15, 2019, and 10-2019-0127433, filed Oct. 15, 2019, the contents of which are all hereby incorporated by reference herein in their entirety.

TECHNICAL FIELD

Embodiments relate to a positioning method in a wireless communication and an apparatus therefor, and more particularly to technology for measuring a position based on a user equipment (UE) or a network in a sidelink vehicle to everything (V2X) system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

Conventional positioning in LTE/NR is considered only for a mobile UE including a single antenna with a limited size or a merged and installed multi-antenna, such as a smartphone or an Internet of Things (IoT), based on downlink time difference of arrival (DL-TDoA) (or observed time difference of arrival (OTDoA)) measurement, and thus there is a problem in that the conventional positioning is not appropriate for measurement of the position of a vehicle.

Positioning of a UE using observed TDoA (OTDoA) of a conventional NR system is performed using a method in which a location server/location management function (LMF) and/or an anchor node (AN) requests the UE to measure reference signal time difference (RSTD) information required for OTDoA positioning and then to report the measured information through a Uu interface and a network measures the position of the UE using the received RSTD and then re-transfers location information to the UE.

Conventional positioning in LTE/NR is considered only for a mobile UE including a single antenna with a limited size or a merged and installed multi-antenna, such as a smartphone or an Internet of Things (IoT), based on downlink time difference of arrival (DL-TDoA) (or observed time difference of arrival (OTDoA)) measurement, and thus there is a problem in that the conventional positioning is not appropriate for measurement of the position of a vehicle.

Such a positioning method based on a network causes large delay until a UE finally receives position information, thereby degrading the reliability of information, and in particular, there is a problem in that physical delay caused by the positioning operation largely degrades the reliability of location information as speed of the UE increases in an NR-V2X system.

DISCLOSURE

Technical Problem

An objective is to provide a UE-based positioning method and apparatus in a wireless communication system for measuring a position for a reference point of a positioning vehicle using a time difference of arrival (TDoA) between a positioning vehicle including a distributed antenna and an anchor node.

Another objective is to provide a UE-based positioning method and apparatus in a wireless communication system for measuring the position i.e., an absolute position, of a reference point of a positioning vehicle through a least-square (LS) approach method after configuring the relative position of the distributed antenna based on the reference point of the positioning vehicle.

Another objective is to an absolute position positioning method and apparatus using a relative position in a sidelink V2X network for correcting an absolute position of an ego vehicle by measuring a relative position for an adjacent vehicle with an absolute position of high accuracy through sidelink.

Another objective is to a network-based positioning method and apparatus for a UE including a distributed antenna.

Another objective is to a network-based positioning method and apparatus for calculating an absolute position of a UE or an absolute position of each distributed antenna based on a reference signal time difference (RSTD) measured in each distributed antenna of the UE and information on a relative position of each distributed antenna based on the reference point of the UE by the network.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect, a user equipment (UE)-based positioning method by a UE in a wireless communication system includes measuring a time difference of arrival (TDoA) for each distributed antenna based on a signal received through a plurality of distributed antennas from an anchor node (AN), configuring a relative position for each of the distributed antennas based on a preconfigured reference point related with the UE, and determining an absolute position as a position of the reference point based on the TDoA measured for each of the distributed antennas and the relative position configured for each of the distributed antennas.

According to an embodiment, the absolute position may be determined based on a least-square (LS) positioning algorithm.

According to an embodiment, the LS positioning algorithm may include at least one of a first LS positioning algorithm for determining the absolute position by applying a weight average to a position of the reference point measured for each of the distributed antennas, or a second LS positioning algorithm for determining the absolute position by combining all the TDoAs measured for the respective distributed antennas.

According to an aspect, the weight may be determined based on at least one of a positioning quality indicator (PQI) of a position of the anchor node, quality of a signal received from the anchor node for each of the distributed antennas, a number of the anchor nodes observed for each of the distributed antennas, or a topology of the anchor node observed for each of the distributed antennas.

According to an embodiment, the TDoA for each of the distributed antennas may be measured based on a single reference anchor node or a multi-reference anchor node.

According to an embodiment, the TDoA may be measured based on a time of arrival (ToA) for a positioning reference signal (PRS) received from a neighboring anchor node for each of the distributed antennas.

According to an embodiment, reference anchor nodes for the respective distributed antennas may be identical or different.

According to an embodiment, the UE may be mounted in the vehicle, and the reference point may be configured as a middle of the vehicle or a center point of a front bumper of the vehicle.

According to an aspect, an apparatus for performing user equipment (UE)-based positioning in a wireless communication includes a radio frequency (RF) transceiver including a plurality of distributed antennas, and a processor connected to the RF transceiver, wherein the processor measures a time difference of arrival (TDoA) for each distributed antenna based on a signal received through a plurality of distributed antennas from an anchor node (AN), configures a relative position for each of the distributed antennas based on a preconfigured reference point related with the apparatus, and determines an absolute position as a position of the reference point based on the TDoA measured for each of the distributed antennas and the relative position configured for each of the distributed antennas.

According to an embodiment, the absolute position may be determined based on a least-square (LS) positioning algorithm.

According to an embodiment, the LS positioning algorithm may include at least one of a first LS positioning algorithm for determining the absolute position by applying a weight average to a position of the reference point measured for each of the distributed antennas, or a second LS positioning algorithm for determining the absolute position by combining all the TDoAs measured for the respective distributed antennas.

According to an embodiment, the weight may be determined based on at least one of a positioning quality indicator (PQI) of a position of the anchor node, quality of a signal received from the anchor node for each of the distributed antennas, a number of the anchor nodes observed for each of the distributed antennas, or a topology of the anchor node observed for each of the distributed antennas.

According to an embodiment, the TDoA for each of the distributed antennas may be measured based on a single reference anchor node or a multi-reference anchor node.

According to an embodiment, the TDoA may be measured based on a time of arrival (ToA) for a positioning reference signal (PRS) received from a neighboring anchor node for each of the distributed antennas.

According to an embodiment, reference anchor nodes for the respective distributed antennas may be identical or different.

According to an embodiment, the apparatus may be mounted in the vehicle, and the reference point may be configured as a middle of the vehicle or a center point of a front bumper of the vehicle.

According to another aspect, a UE-based positioning method by a UE in a sidelink vehicle to everything (V2X) network includes searching for a neighboring vehicle with absolute position accuracy equal to or greater than a reference based on that absolute position accuracy of an ego vehicle with the UE mounted therein is equal to or less than the reference, receiving absolute position information from the searched neighboring vehicle when the neighboring vehicle with the absolute position accuracy equal to or greater than the reference is searched, acquiring relative position information of the searched neighboring vehicle by performing a relative positioning operation on the searched neighboring vehicle, and correcting an absolute position of the ego vehicle based on the received absolute position information and the acquired relative position information.

According to another aspect, an apparatus for performing a UE-based positioning in a sidelink vehicle to everything (V2X) network includes a radio frequency (RF) transceiver including a plurality of distributed antennas, and a processor connected to the RF transceiver, wherein the processor searches for a neighboring vehicle with absolute position accuracy equal to or greater than a reference based on that absolute position accuracy of an ego vehicle with the UE mounted therein is equal to or less than the reference, receives absolute position information from the searched neighboring vehicle through the RF transceiver when the neighboring vehicle with the absolute position accuracy equal to or greater than the reference is searched, acquires relative position information of the searched neighboring vehicle by performing a relative positioning operation on the searched neighboring vehicle, and correct an absolute position of the ego vehicle based on the received absolute position information and the acquired relative position information.

According to another aspect, a network-based positioning method by a network in a wireless communication system includes receiving a message including information related to a plurality of distributed antennas from a device and determining a position related to the device based on the message, wherein the information related to the plurality of distributed antennas includes reference signal time difference (RSTD) information measured in each distributed antenna of each device and relative position information of each of the distributed antennas for a reference point defined for the device.

According to an embodiment, the method may further include transmitting the determined position to the device, wherein the determined position may include any one of the reference point position of the device and a position of each of the distributed antennas.

According to an embodiment, the method may further include receiving at least one of information on whether to support a distributed antenna, information on a number of distributed antennas, location based service (LBS) required quality information, or positioning capability information from the device, wherein a positioning mode may be determined based on at least one of the LBS required quality information or the positioning capability information.

According to an embodiment, any one of the reference point position and a position of each of the distributed antennas may be determined according to the determined positioning mode and may be transmitted to the device.

According to an embodiment, the reference point position may be determined without determination of the position of each of the distributed antenna according to the determined positioning mode.

According to an embodiment, information related to the plurality of distributed antennas may further include at least one of received signal received power (RSRP) measured in each of the distributed antennas or received signal strength indicator (RSSI) information, and an anchor node that is supposed to participate in positioning of the device may be determined based on at least one of the RSRP information or the RSSI information.

According to an embodiment, the method may further include transmitting control information for the RSTD measurement to the device, wherein the control information may include at least one of a number and unique ID information of distributed antennas, the RSTD of which is supposed to be measured, or information on a number of the RSRP and/or the RSSI measured by each of the distributed antennas, the RSTD of which is supposed to be measured.

According to an embodiment, the device may be a vehicle including the plurality of distributed antennas AT-j, where j=1, . . . , N, N being a natural number.

The relative position information may include an angle θ between an x axis of bearing and heading of the vehicle, an angle $\theta_j$ between the heading of the vehicle and a $j^{th}$ distributed antenna, and a distance dj between the reference point and the $j^{th}$ distributed antenna.

According to another aspect, a network-based positioning method by a vehicle in a wireless communication system includes transmitting a message including information related to a plurality of distributed antennas to a network and receiving the location information related to the vehicle, wherein the information related to the plurality of distributed antennas include reference signal time difference (RSTD) information measured in each distributed antenna and relative position information of each of the distributed antennas for a reference point defined in the vehicle, and a position related to the vehicle is determined by the network based on the information related to the plurality of distributed antennas.

According to another aspect, an apparatus for performing a network-based positioning by a network in a wireless communication system includes a radio frequency (RF) transceiver and a processor connected to the RF transceiver, wherein the processor controls the RF transceiver to receive a message including information related to a plurality of distributed antennas from a vehicle and determines a position related to the vehicle based on the message, wherein the information related to the plurality of distributed antennas includes reference signal time difference (RSTD) information measured in each distributed antenna and relative position information of each of the distributed antennas for a reference point defined in the vehicle.

Advantageous Effects

Various embodiments may advantageously provide a UE-based positioning method and apparatus in a wireless communication system for more accurately measuring a position for a target vehicle based on a time difference of arrival (TDoA) between a positioning vehicle including a distributed antenna and an anchor node and a relative position of a distributed antenna based on a reference point of the positioning vehicle.

Various embodiments may advantageously provide a UE-based positioning method and apparatus in a wireless communication system for measuring the position i.e., an absolute position, of a reference point of a positioning vehicle through a least-square (LS) approach method after configuring the relative position of the distributed antenna based on the reference point of the positioning vehicle.

The LS-based positioning algorithm according to various embodiments may be advantageously and commonly applied irrespective of the number of reference ANs.

Various embodiments may advantageously provide an absolute position positioning method and apparatus using a relative position in a sidelink V2X network for correcting an absolute position of an ego vehicle by measuring the relative position of an adjacent vehicle with an absolute position of high accuracy through sidelink.

Various embodiments may advantageously provide an absolute position positioning method and apparatus using a relative position in a sidelink V2X network for improving distance measurement accuracy between an ego vehicle and a neighboring vehicle by correcting the absolute position of the neighboring vehicle based on the absolute position of the ego vehicle with a high confidence level and a relative position with the neighboring vehicle.

Various embodiments may advantageously measure the position of a vehicle with higher accuracy by calculating an absolute position (i.e., a position of a reference point) of the vehicle based on the RSTD measured in distributed antennas of the vehicle and the relative position of the distributed antenna based on the reference point of the vehicle.

Various embodiments may advantageously distribute network processing load and positioning related signaling load between a network and a UE by calculating an absolute position for each distributed antenna based on an RSTD collected from the UE and a relative position of a distributed antenna and providing the calculated absolute position to the UE by the network, and calculating the absolute position of the UE based on the absolute position of each distributed antenna by the UE.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings are provided to provide an understanding of the present disclosure, and are intended to illustrate various embodiments of the present disclosure and, together with the description of the specification, explain the principles of the present disclosure.

BEST MODE

Figure 1:
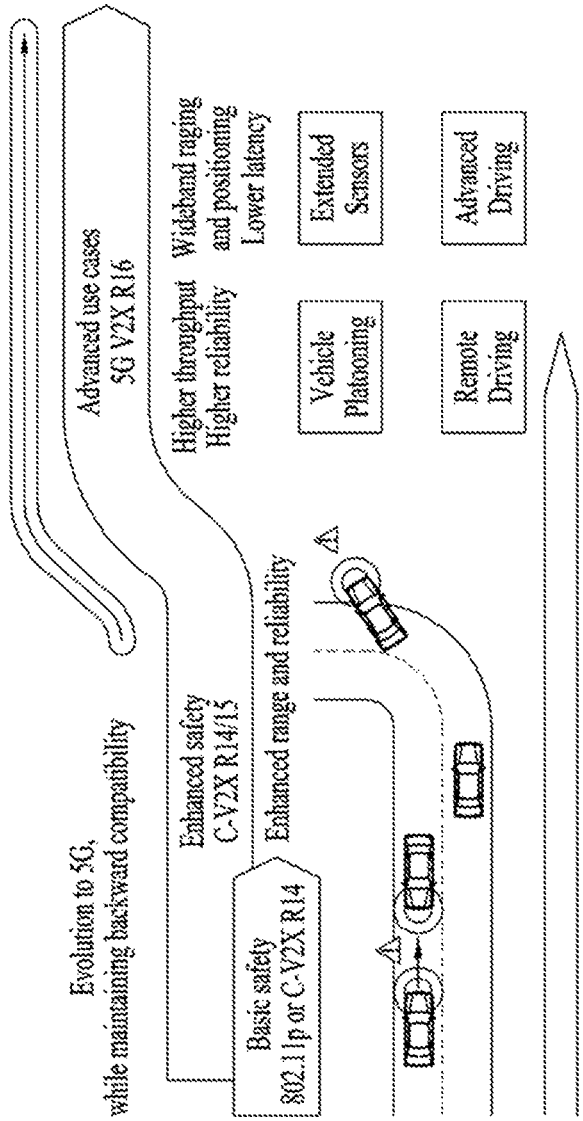
FIG. 1 is a diagram illustrating vehicle-to-everything (V2X) communication based on pre-new radio access technology (NR) RAT and V2X communication based on NR in comparison.

According to an aspect, a user equipment (UE)-based positioning method by a UE in a wireless communication system includes measuring a time difference of arrival (TDoA) for each distributed antenna based on a signal received through a plurality of distributed antennas from an anchor node (AN), configuring a relative position for each of the distributed antennas based on a preconfigured reference point related with the UE, and determining an absolute position as a position of the reference point based on the TDoA measured for each of the distributed antennas and the relative position configured for each of the distributed antennas.

MODE

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 2:
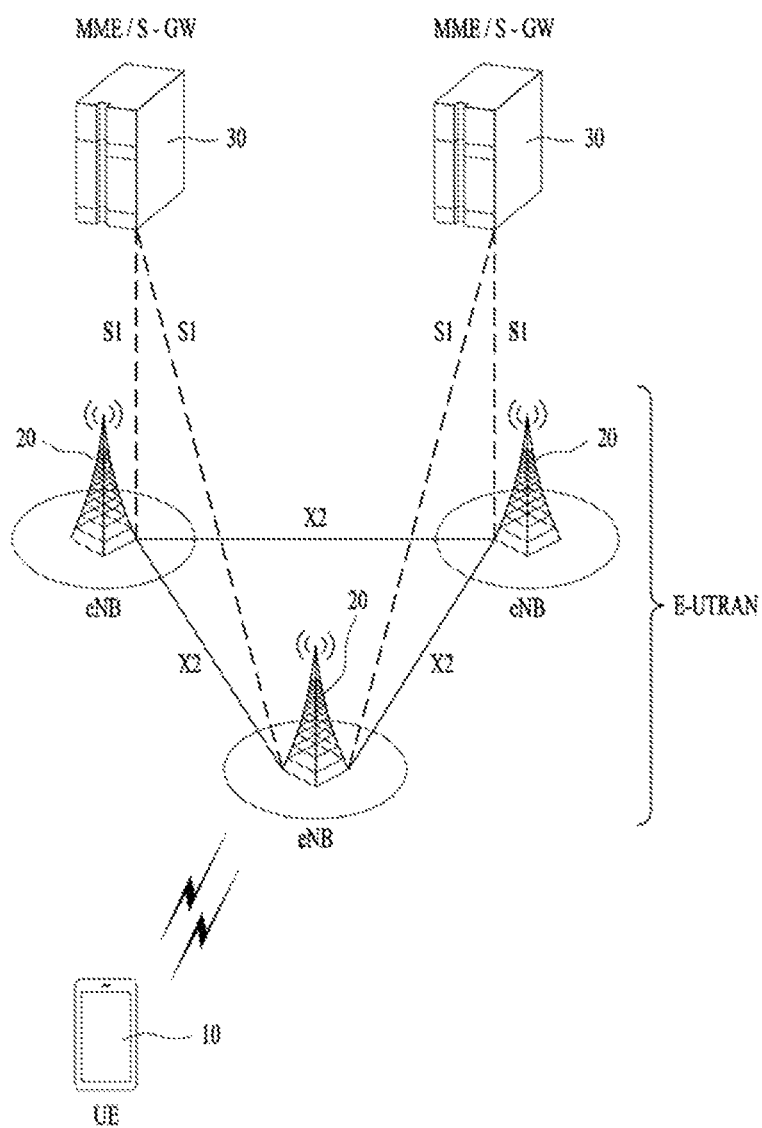
FIG. 2 is a diagram illustrating the structure of a long term evolution (LTE) system.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
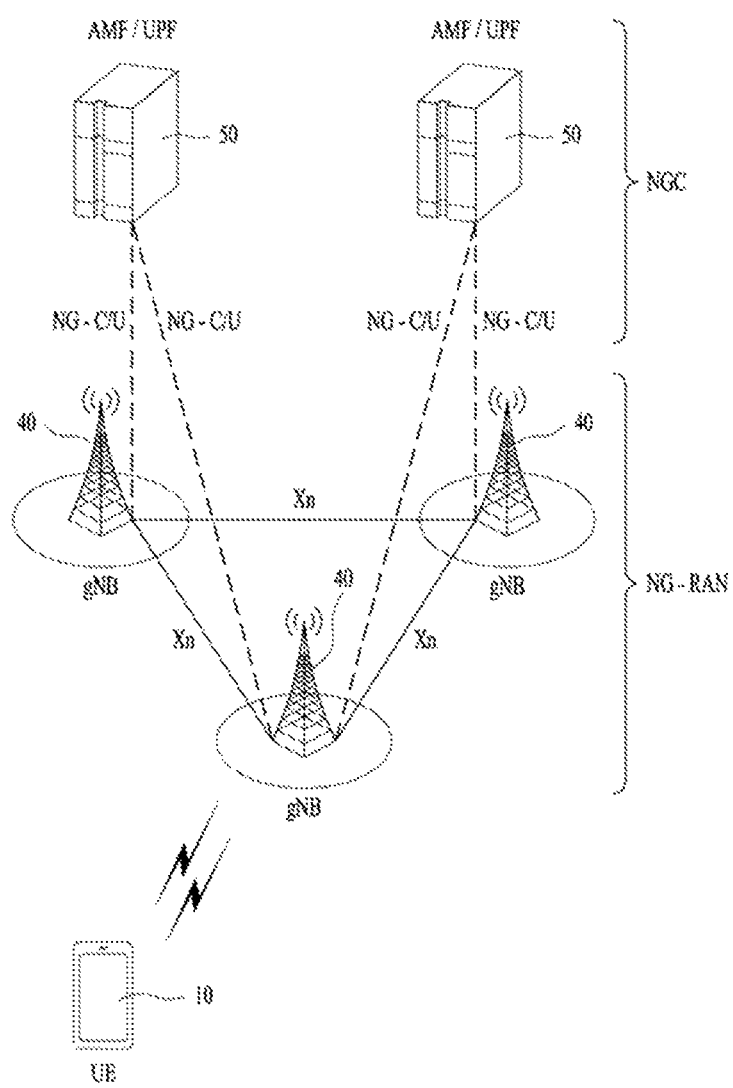
FIG. 3 is a diagram illustrating the structure of an NR system.

FIG. 3 illustrates the structure of an NR system

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
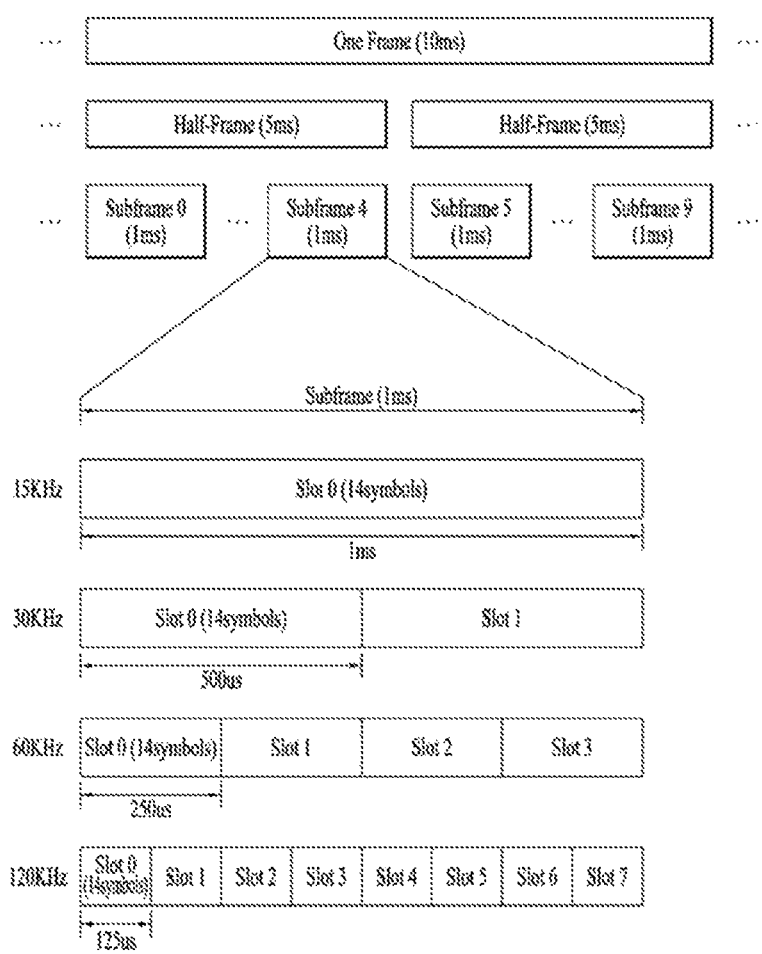
FIG. 4 is a diagram illustrating the structure of an NR radio frame.

FIG. 4 illustrates a radio frame structure in NR.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot Nslotsymb, the number of slots per frame Nframe,uslot, and the number of slots per subframe Nsubframe,uslot according to an SCS configuration µ in the NCP case.

TABLE 1

| SCS (15*2u) | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | Nslotsymb | Nframe, uslot | Nsubframe, uslot |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells. In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
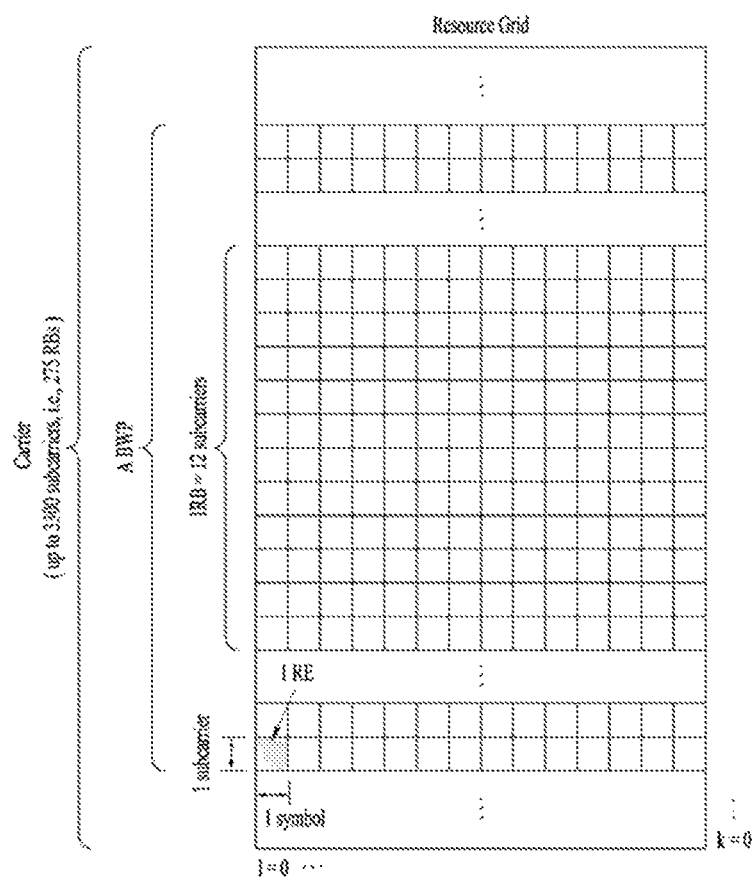
FIG. 5 is a diagram illustrating a slot structure in an NR frame

FIG. 5 illustrates a slot structure in an NR frame.

Referring to FIG. 5, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 6:
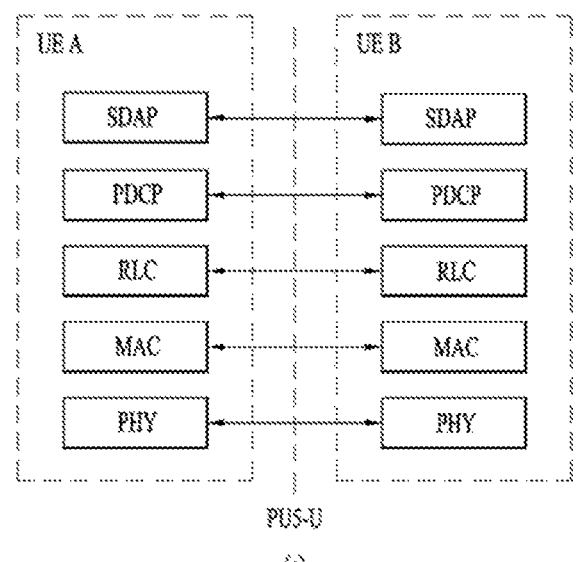
FIG. 6 is a diagram illustrating radio protocol architectures for sidelink (SL) communication.
Figure 6:
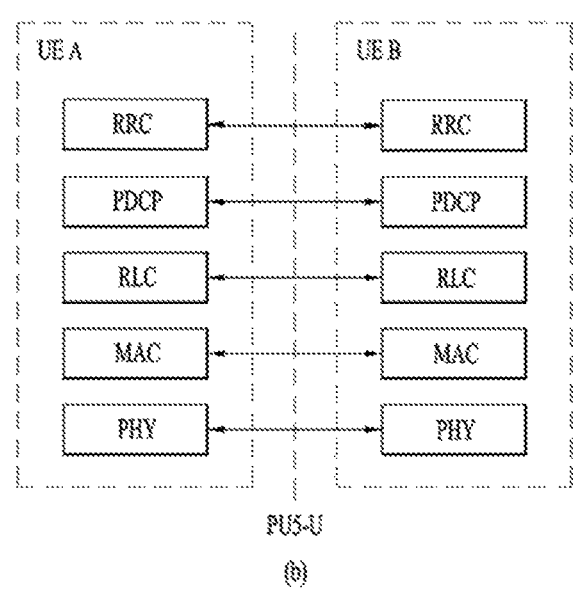

FIG. 6 illustrates a radio protocol architecture for SL communication Specifically, FIG. 6(a) illustrates a user-plane protocol stack in LTE, and FIG. 6(b) illustrates a control-plane protocol stack in LTE.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
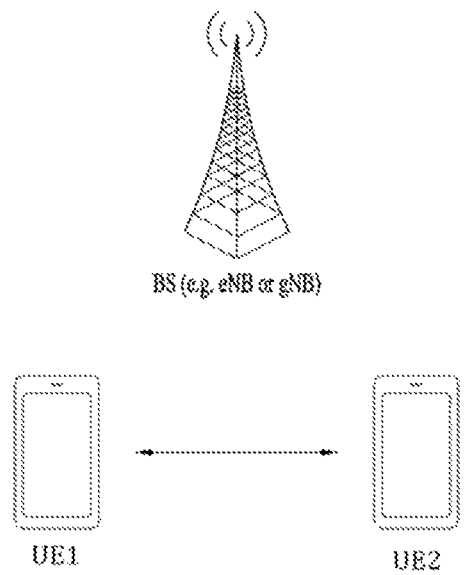
FIG. 7 is a diagram illustrating user equipments (UEs) which conduct V2X or SL communication between them

FIG. 7 illustrates UEs that conduct V2X or SL communication between them

Referring to FIG. 7, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 8:
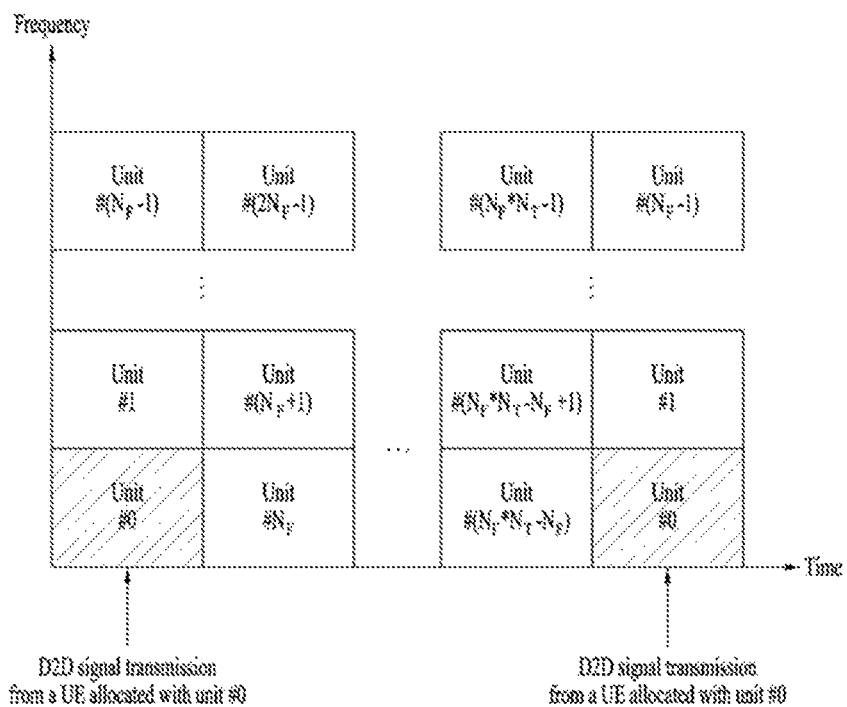
FIG. 8 is diagram illustrating resource units for V2X or SL communication

FIG. 8 illustrates resource units for V2X or SL communication.

Figure 13:
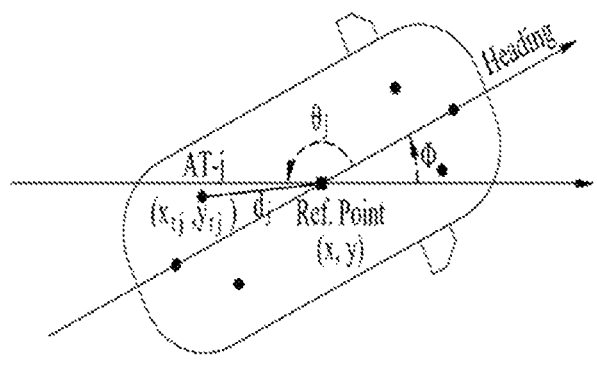
FIG. 13 is a diagram for explaining a position configuring method of a distributed antenna based on a reference point according to an embodiment.
Figure 13:
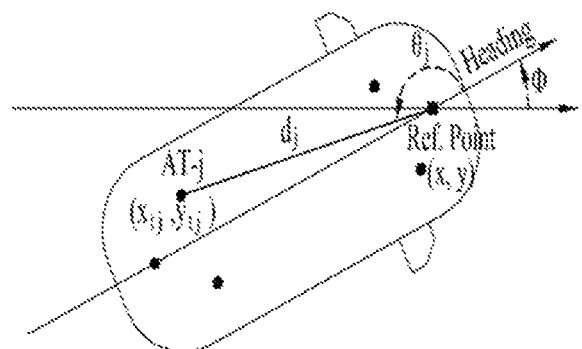

Referring to FIG. 13, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel (2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 9:
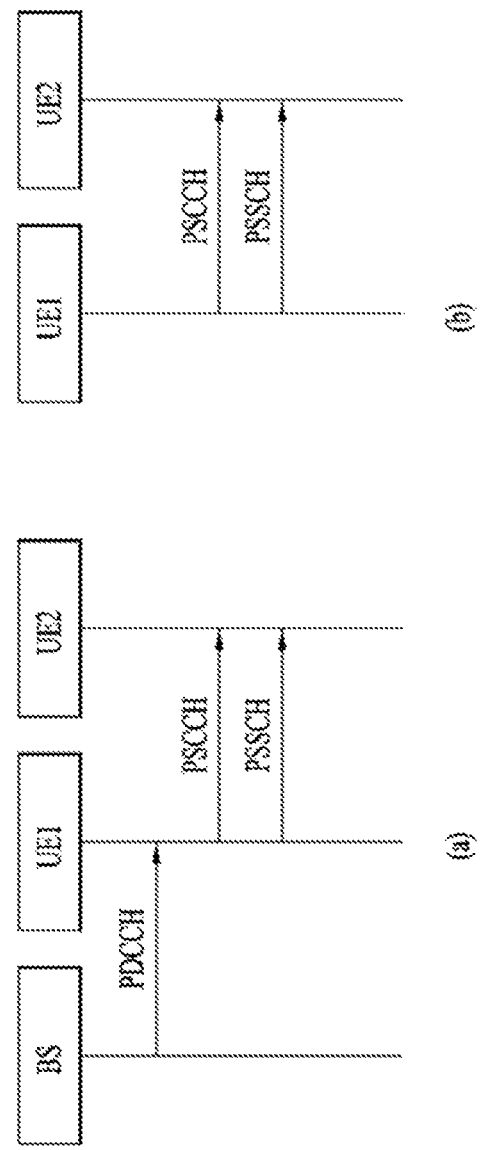
FIG. 9 is a diagram illustrating signal flows for V2X or SL communication procedures of a UE according to transmission modes

FIG. 9 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 9 (a) illustrates a UE operation related to LTE transmission mode 1 or LTE transmission mode 3. Alternatively, for example, FIG. 9 (a) illustrates a UE operation related to NR resource allocation mode 1. For example, LTE transmission mode 1 may be applied to general SL communication, and LTE transmission mode 3 may be applied to V2X communication.

For example, FIG. 9 (b) illustrates a UE operation related to LTE transmission mode 2 or LTE transmission mode 4. Alternatively, for example, FIG. 9 (b) illustrates a UE operation related to NR resource allocation mode 2.

Referring to FIG. 9(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every X ms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 9 (b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

- PSSCH-related and/or PSCCH-related resource allocation information, for example, the positions/number of time/frequency resources, resource reservation information (e.g. a periodicity), and/or
- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or
- MCS information, and/or
- transmission power information, and/or
- L1 destination ID information and/or L1 source ID information, and/or
- SL HARQ process ID information, and/or
- new data indicator (NDI) information, and/or
- redundancy version (RV) information, and/or
- QoS information (related to transmission traffic/packet), for example, priority information, and/or
- An SL CSI-RS transmission indicator or information about the number of SL CSI-RS antenna ports (to be transmitted);
- Location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Hereinafter, acquisition of synchronization of a SL UE will be described.

In time division multiple access (TDMA) and frequency division multiples access (FDMA) systems, accurate time and frequency synchronization may be required. When the time and frequency synchronization are not accurate, system performance may be degraded due to inter symbol interference (ISI) and inter carrier interference (ICI). This is also applied to V2X in the same way. In V2X, for time/frequency synchronization, a sidelink (SL) synchronization signal (SLSS) may be used in physical layer, and a master information block-sidelink-V2X (MIB-SL-V2X) may be used in a radio link control (RLC) layer.

Tx/Rx Beam Sweep

When a very high frequency is used as in mmWave, beamforming may be generally used to overcome high pathloss. In order to use beamforming, first, the best beam pair needs to be detected among several beam pairs between a transmitting end and a receiving end. This process may be referred to as beam acquisition or beam tracking or beam tracking in terms of the receiving end. In particular, in mmWave, analog beamforming is used, and thus a vehicle needs to perform beam sweeping for switching beams in different directions at different times using an antenna array of the vehicle itself during the beam acquisition or the beam tracking.

Multiple Active Sidelink BWPs

In NR V2X, communication through support of a plurality of BWPs (i.e., support of a plurality of configured sidelink BWPs and/or support of a plurality of active sidelink BWPs) may be considered. This may be for supporting different numerologies or heterogeneous services/communications that require parameters and/or requirements or may also be for ICI reduction due to a reduced CP length.

Figure 10:
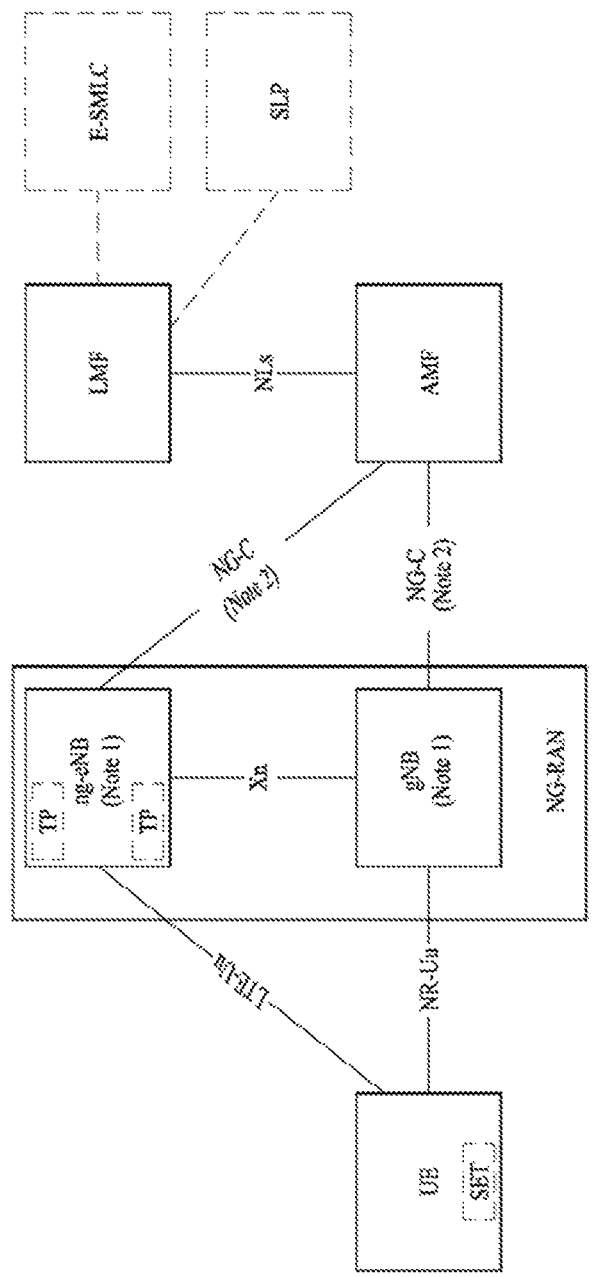
FIG. 10 illustrates an exemplary architecture of a 5G system capable of positioning a UE connected to an NG-RAN or an E-UTRAN according to an embodiment of the present disclosure.

FIG. 10 illustrates an exemplary architecture of a 5G system capable of positioning a UE connected to an NG-RAN or an E-UTRAN according to an embodiment of the present disclosure.

Referring to FIG. 10, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDoA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 11:
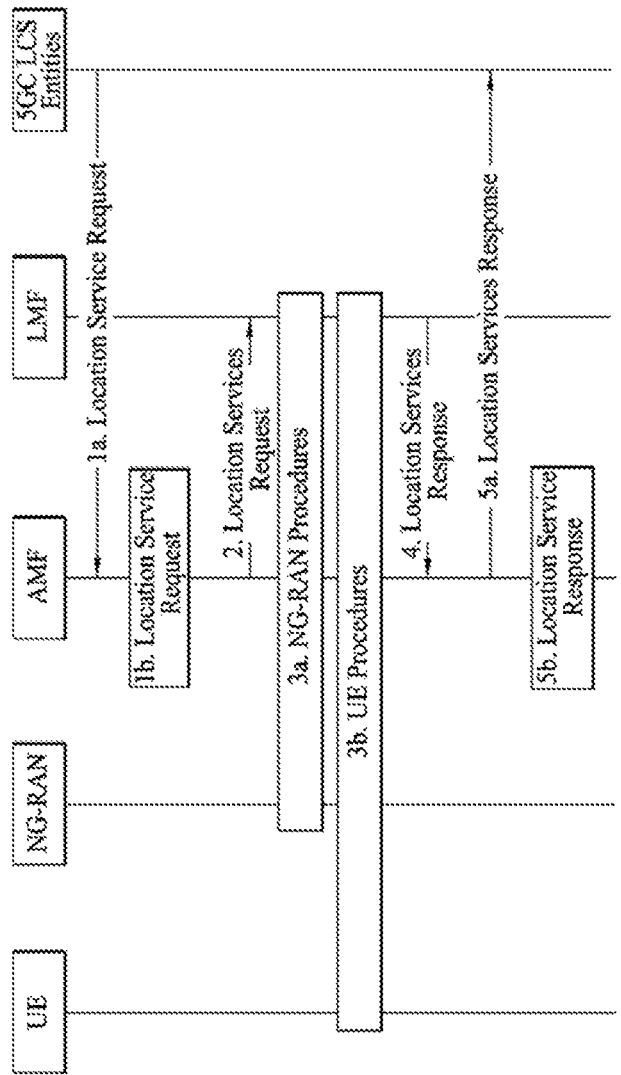
FIG. 11 illustrates an exemplary implementation of a network for positioning a UE according to an embodiment of the present disclosure.

FIG. 11 illustrates exemplary implementation of a network for positioning a UE according to an embodiment of the present disclosure.

Upon receipt of a location service request when the UE is in a connection management-IDLE (CM-IDLE) state, the AMF may establish a signaling connection with the UE and request a network trigger service to assign a specific serving gNB or ng-eNB. This operation is not shown in FIG. 11. That is, FIG. 11 may be based on the assumption that the UE is in connected mode. However, the signaling connection may be released by the NG-RAN due to signaling and data deactivation during positioning.

Referring to FIG. 11, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

Figure 24:
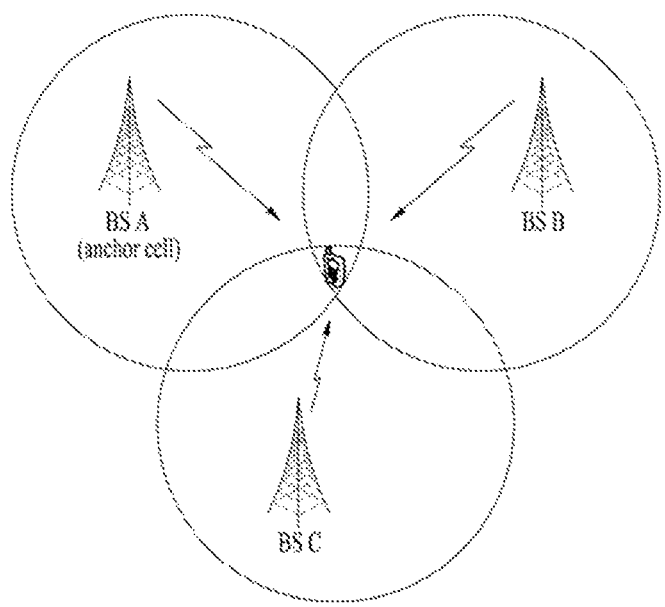
FIG. 24 is a diagram illustrating an OTDoA positioning method according to an embodiment of the present disclosure.

In step 4, the LMF may provide a location service response to the AMF. The location service response may include information indicating whether location estimation of the UE was successful and the location estimate of the UE. Then, when the procedure of FIG. 24 is initiated in step 1a, the AMF may deliver the location service response to the 5GC entity such as the GMLC. When the procedure of FIG. 24 is initiated in step 1b, the AMF may use the location service response to provide the location service related to an emergency call or the like.

Embodiment 1

Figure 12:
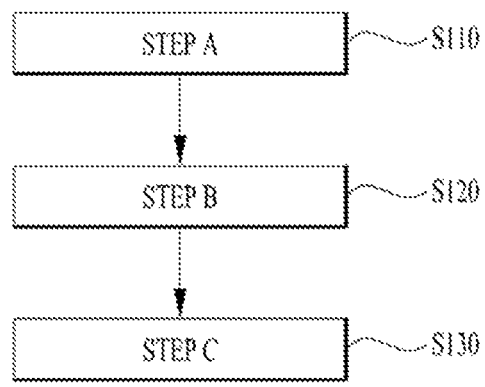
FIG. 12 is a flowchart for explaining a UE-based positioning method according to an embodiment.

FIG. 12 is a flowchart for explaining a UE-based positioning method according to an embodiment.

Referring to FIG. 12, the UE-based positioning method may include STEP A S110, STEP B S120, and STEP C S130.

A UE according to an embodiment may communicate with an adjacent UE through sidelink and may communicate with a network through a Uu interface.

Here, the network may include a location server, a location measurement function (LMF), and a base station, which perform positioning of the UE. For example, the UE may be provided in a vehicle, and a plurality of antennas—hereinafter referred to as a distributed antenna for convenience of description—which is connected to the vehicle and is distributed in the vehicle may be installed in the vehicle. A specific location in the vehicle may be predefined as a reference point and may be configured to the UE of the vehicle. For example, the reference point may be defined and configured as the middle of the vehicle or the center point of a front bumper of the vehicle, but this is only an embodiment, and the location of the reference point may be defined and configured differently according to a design of those skilled in the art. The reference point may be configured to a fixed value, but the location of the actual reference point may be changed according to movement of a UE (i.e., a vehicle). Hereinafter, the location of the reference point may refer to the current location of the UE (or a vehicle).

For example, there may be one reference point in a vehicle, but this is only an embodiment, and a plurality of reference points may be arbitrarily defined and configured based on the type of the vehicle according to a design of those skilled in the art.

Hereinafter, STEP A S110 and STEP B S120 will be described in more detail.

STEP A S110

The UE may receive sidelink control information (SCI) from an anchor node such as a BS or another UE. Here, the SCI may include location information and positioning quality indicator (PQI) of the corresponding AN.

The SCI may be transmitted through a physical sidelink control channel (PSCCH) and (or) physical sidelink shared channel (PSSCH) of an NR-V2X service slot or may be transmitted through a newly inserted slot for positioning.

The UE may receive a positioning reference signal (PRS) transmitted from a neighboring AN and may measure a time of arrival (ToA) through a distributed antenna.

The UE may measure TDoA using the ToA measured in each distributed antenna.

In this case, reference ANs of distributed antennas, which are reference for the TDoA measurement, may be the same or different. That is, the distributed antennas may measure the TDoA using a single reference AN or may measure the TDoA using multi-reference AN.

STEP B S120

The UE may configure s relative position of the distributed antenna based on the reference point.

A method of configuring the relative position of the distributed antenna based on the reference point will become clearer through the following description of the drawings.

STEP C S130

The UE may determine a position—i.e., absolute position—of a reference point based on the TDoA measured in the distributed antenna and the relative position of the distributed antenna.

The UE may perform positioning for the reference point by optimally combining the TDoA measured through a positioning algorithm to which least-square (LS) approach is applied.

According to an embodiment, the LS positioning algorithm may include a first LS positioning algorithm that is a method of measuring the location of a final reference point by applying a weight average for location information of the reference points measured in the respective distributed antennas and a second LS positioning algorithm that is a method of measuring the location of a reference point by combining all TDoAs measured in the respective distributed antennas.

Method of Configuring Position of Distributed Antenna

FIG. 13 is a diagram for explaining a position configuring method of a distributed antenna based on a reference point according to an embodiment.

For positioning of a vehicle including a distributed antenna, a reference point of the vehicle needs to be predefined.

The reference point may be a point indicated by the position of the vehicle, may be predefined as an arbitrary point of the vehicle, and may be differently defined according to the vehicle.

FIG. 13 is a diagram for explaining a reference point configuration for measuring the position of a vehicle when a plurality of antennas (AT-j,j=1, ... ,N) are distributed and arranged in the vehicle according to an embodiment. Reference numeral (a) illustrates the case in which the reference point is placed at the exact center (e.g., a roof) of the vehicle, and reference numeral (b) illustrates the case in which the reference point is placed at the center of a front bumper of the vehicle.

The reference point may be used to indicate the position of any one of a plurality of distributed antennas provided in the vehicle. The reference point may also be used to indicate the relative position of each of the plurality of distributed antennas provided in the vehicle based on the reference point.

Hereinafter, with reference to FIG. 14, a method of measuring a position of a reference point using the position of each distributed antenna will be described in detail.

A position of a reference point using a position $(x_{tj}, y_{tj})$ of each distributed antenna may be represented as Equation (1) below.

$$(x,y) = (x_{tj}, y_{tj}) + (\Delta x_j, \Delta y_j) j = 1, \ldots, N \qquad (1)$$

In Equation (1) above, (x,y) represents a position of a reference point, and $(\Delta x_j, \Delta y_j)$ represents a relative position of a $j^{th}$ antenna based on the reference point. In this case, $(\Delta x_j, \Delta y_j)$ may be represented as $(\Delta x_j, \Delta y_j) = (d_j \cos(\varnothing+\theta_j), d_j \sin(\varnothing+\theta_j))$ using angle $\varnothing$ information between the x axis of bearing and heading of the vehicle, angle $\theta_j$ information between heading and a $j^{th}$ antenna, and distance $d_j$ information between the reference point and the $j^{th}$ antenna. Here, $\{\varnothing, \theta_j, d_j\}$ may be predefined or may be measured by a vehicle. As a result, the position of the reference point using the position of a $j^{th}$ antenna of Equation (1) above may be represented as Equation (2) below.

$$(x,y)=(x_{tj},y_{tj})+(d_j\cos(\varnothing+\theta_j),d_j\sin(\varnothing+\theta_j)) \quad (2)$$

A RSTD ($\tau_{tj,mR}$) between an $m^{th}$ AN and a reference AN (or an $R^{th}$ AN), measured in the $j^{th}$ antenna, may be represented as Equation (3) below.

$$\tau_{tj,mR}=(D_{tj,m}-D_{tj,R})/c \quad (3)$$

Here, $D_{tj,R}$ and $D_{tj,m}$ may be a distance between the $j^{th}$ antenna and a reference AN and a distance between the $j^{th}$ antenna and the $m^{th}$ AN, measured in the vehicle, respectively, and c may be speed of light.

A distance difference $d_{tj,mR}$ corresponding to the TDoA from Equation (3) above may be represented as Equation (4) below.

$$d_{tj,mR}=c\tau_{tj,mR}D_{tj,m}-D_{tj,R} \quad (4)$$

A distance squared difference $(D_{tj,m}^2-D_{tj,R}^2)$ between the $m^{th}$ AN and the reference AN, measured in the $j^{th}$ antenna, may be represented as Equation (5) below.

$$D_{tj,m}^2-D_{tj,R}^2=[(x_{tj,m}-x_{tj})^2+(y_{tj,m}-y_{tj})^2]-[(x_{tj,R}-x_{tj})^2+(y_{tj,R}-y_{tj})^2] \quad (5)$$

Here, $(x_{tj,m}, t_{tj,m})$ may refer to position information of the $m^{th}$ AN in terms of the $j^{th}$ antenna and $(x_{tj,R}, y_{tj,R})$ may refer to the position of a reference AN in terms of the $j^{th}$ antenna. In this case, $(x_{tj,m}, t_{tj,m})$ and $(x_{tj,R}, y_{tj,R})$ may be assumed to be information that is previously known to the vehicle. The term of a left side of Equation (5) above may be represented as Equation (6) below using Equation (4) above.

$$D_{tj,m}^2-D_{tj,R}^2=d_{tj,mR}^2+2D_{tj,mR} \quad (6)$$

Equation (5) above may be represented as a linear expression for a variable $\{x_{tj}, y_{tj}, D_{tj,R}\}$ in Equation (7) below using Equation (6).

$$2(x_{tj,m}-x_{tj,R})x_{tj}+2(y_{tj,m}-y_{tj,R})y_{tj}+2D_{tj,R}d_{tj,mR}=x_{tj,m}^2-x_{tj,R}^2+y_{tj,m}^2-y_{tj,R}^2-d_{tj,mR}^2 \quad (7)$$

Equation (7) above may be represented as a linear expression for a variable $\{x, y, D_{tj,R}\}$ in terms of the reference point. Equation (7) above may be represented as Equation (8) below using $x_{tj}=x+d_j\cos(\varnothing+\theta_j)$ and $y_{tj}=y+d_j\sin(\varnothing+\theta_j)$ of Equation (2) above.

$$(x_{tj,m}-x_{tj,R})x+(y_{tj,m}-y_{tj,R})y+D_{tj,R}d_{tj,mR}=k_{tj,mR} \quad (8)$$

Here, constant $k_{tj,mR}$ may be represented as follows.

$$k_{tj,mR}=[(x_{tj,m}-x_{tj,R})(x_{tj,m}+x_{tj,R}-2d_j\cos(\varnothing+\theta_j))+(y_{tj,m}-y_{tj,R})(y_{tj,m}+y_{tj,R}-2d_j\sin(\varnothing+\theta_j))-d_{tj,mR}^2]/2$$

Positioning Method

Hereinafter, a positioning method using a plurality of TDoAs measured through a single or multi-reference AN in each distributed antenna will be described in detail.

Figure 14:
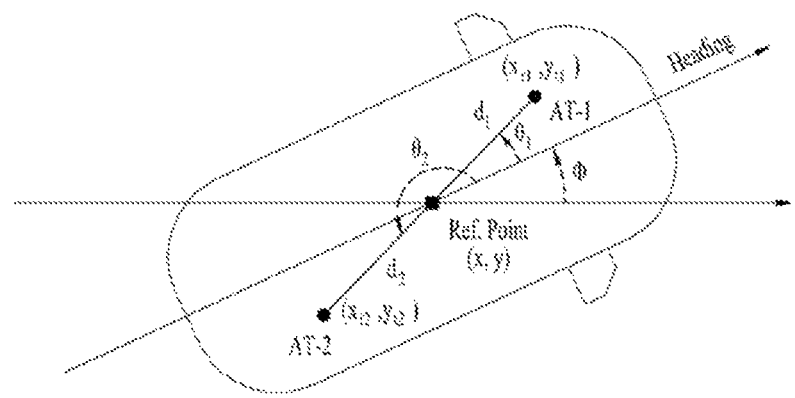
FIG. 14 is a diagram for explaining a method of configuring a relative position of each distributed antenna based on a reference point in a vehicle including two distributed antennas according to an embodiment.

FIG. 14 is a diagram for explaining a method of configuring a relative position of each distributed antenna based on a reference point in a vehicle including two distributed antennas according to an embodiment.

Referring to FIG. 14, two distributed antennas AT-1 and AT-2 may be placed in the vehicle, and a reference point Ref. Point may be positioned at the exact center of the vehicle. In this case, the position of each distributed antenna based on the reference point (x,y) may be represented as Equations (9) to (10) below.

$$(t_{t1},y_{t1})=(x,y)+(d_1\cos(\varnothing+\theta_1),d_1\sin(\varnothing+\theta_1)) \quad (9)$$

$$(t_{t2},y_{t2})=(x,y)+(d_2\cos(\varnothing+\theta_2),d_1\sin(\varnothing+\theta_2)) \quad (10)$$

Hereinafter, various positioning scenarios using a distributed antenna will be described with reference to FIGS. 15 to 17.

Figure 15:
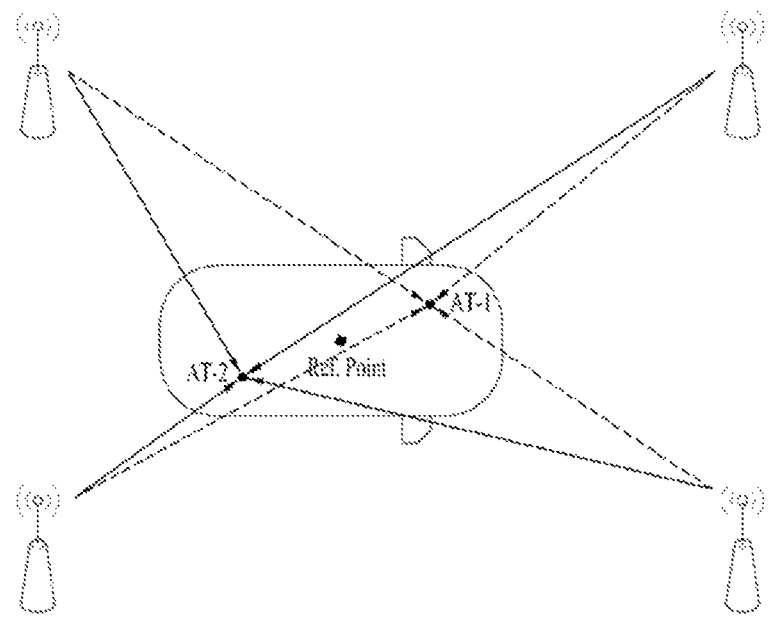
FIG. 15 is a diagram for explaining a TDoA measurement and positioning scenario using a single reference AN according to an embodiment.

FIG. 15 is a diagram for explaining a TDoA measurement and positioning scenario using a single reference AN according to an embodiment.

In detail, FIG. 15 illustrates a scenario of TDoA measurement using a single reference AN and positioning using two distributed antennas when all ANs are a BS and two distributed antennas AT-1 and AT-2 are placed in the vehicle.

Referring to FIG. 15, TDoA measurement in the two distributed antennas may be performed in consideration of the same reference AN, and as a result, the performance of a positioning process for the reference point may be improved through a combined structure in the same form as diversity.

Figure 16:
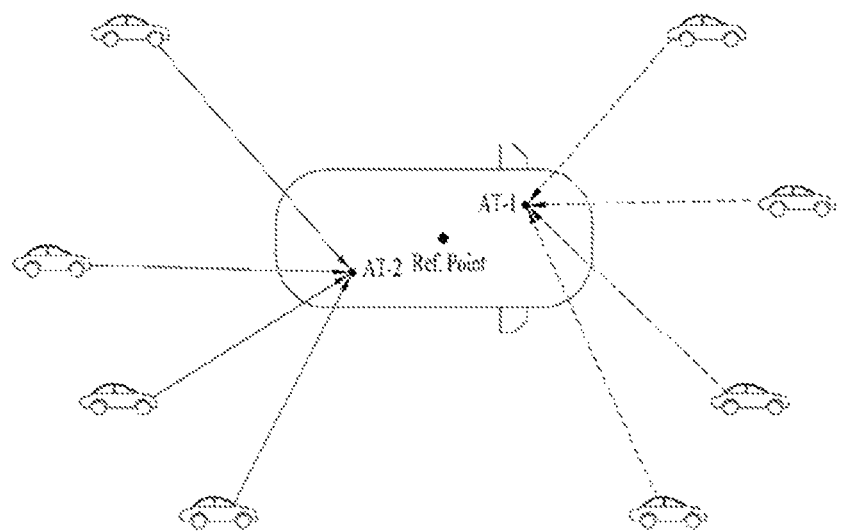
FIG. 16 is a diagram for explaining a TDoA measurement and positioning scenario using a multi-reference AN according to an embodiment.

FIG. 16 is a diagram for explaining a TDoA measurement and positioning scenario using a multi-reference AN according to an embodiment.

In detail, FIG. 16 illustrates a scenario of TDoA measurement using a multi-reference AN and positioning using two distributed antennas when all ANs are a UE (vehicle) and two distributed antennas AT-1 and AT-2 are placed in an ego vehicle.

In such a scenario, the case in which coverage of the distributed antennas is different may be considered.

TDoA measurement in the two distributed antennas may be performed in consideration of different reference ANs, and as a result, the performance of a positioning process for the reference point may be improved through a combined structure in the same form as multiplexing.

Figure 17:
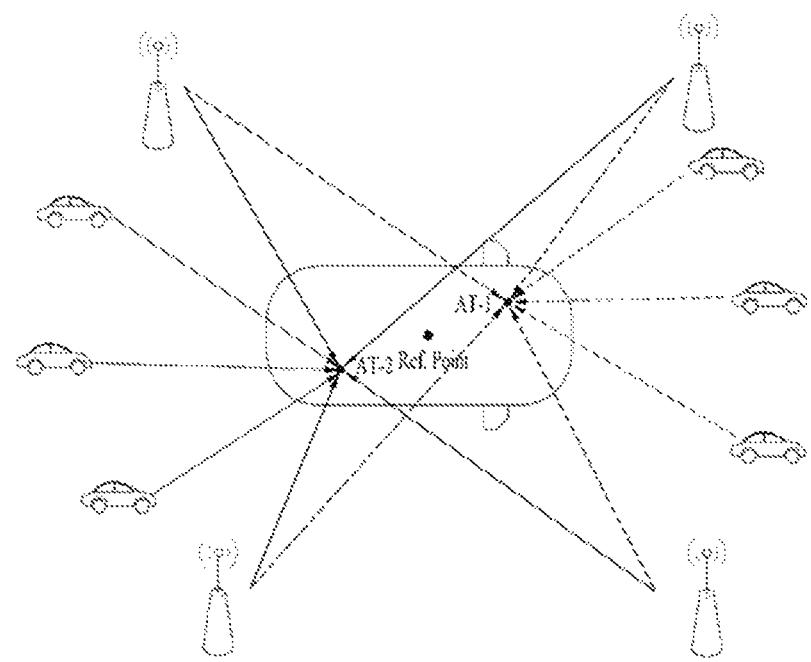
FIG. 17 is a diagram for explaining a TDoA measurement and positioning scenario using a single reference AN according to another embodiment.

FIG. 17 is a diagram for explaining a TDoA measurement and positioning scenario using a single reference AN according to another embodiment.

In detail, FIG. 17 illustrates a scenario of TDoA measurement using a single reference AN and positioning using two distributed antennas when ANs include a UE (vehicle) and a BS and two distributed antennas AT-1 and AT-2 are placed in an ego vehicle. In this case, the BS may function as a single reference AN.

Hereinafter, the aforementioned positioning methods for the reference point in consideration of various TDoA measurement scenarios using a single reference AN and a multi-reference AN will be described in detail. In particular, a TDoA combining method using an LS algorithm may be proposed.

An equation related to TDoA measured in two distributed antennas from Equation (8) above may be linearly represented by Equations (11) and (12) below for a variable $\{x, y, D_{tj,R}\}$.

$$(x_{t1,m}-x_{t1,R})x+(y_{t1,m}-y_{t1,R})y+D_{t1,R}d_{t1,mR}=k_{t1,mR} \quad (11)$$

$$(x_{t2,m}-x_{t2,R})x+(y_{t2,m}-y_{t2,R})y+D_{t2,R}d_{t2,mR}=k_{t2,mR} \quad (12)$$

In Equations (11) and (12) above, constants $k_{t1,mR}$ and $k_{t2,mR}$ may be as follows.

$$k_{t1,mR}=[(x_{t1,m}-x_{t1,R})(x_{t1,m}+x_{t1,R}-2d_1\cos(\varnothing+\theta_1))+(y_{t1,m}-y_{t1,R})(y_{t1,m}+y_{t1,R}-2d_1\sin(\varnothing+\theta_1))-d_{t1,mR}^2]/2$$

$$k_{t2,mR}=[(x_{t2,m}-x_{t2,R})(x_{t2,m}+x_{t2,R}-2d_2\cos(\varnothing+\theta_2))+(y_{t2,m}-y_{t2,R})(y_{t2,m}+y_{t2,R}-2d_2\sin(\varnothing+\theta_2))-d_{t2,mR}^2]/2$$

In Equations (11) and (12), when ANs observed from the distributed antennas are the same as in the scenario of FIG. 15, $x_{t1,m}=x_{t2,m}$, $y_{t1,m}=y_{t2,m}$, $x_{t1,R}=x_{t2,R}$, $y_{t1,R}=y_{t2,R}$, and $d_{t1,mR} \ne d_{t2,mR}$, $D_{t1,R} \ne D_{t2,R}$. In contrast, in the case of the scenario of FIG. 16, ANs observed from the distributed antennas may not be the same, and as a result, $x_{t1,m} \ne x_{t2,m}$, $y_{t1,m} \ne y_{t2,m}$, $x_{t1,R} \ne x_{t2,R}$, $y_{t1,R} \ne y_{t2,R}$, $d_{t1,mR} \ne d_{t2,mR}$, $D_{t1,R} \ne D_{t2,R}$. In the case of the scenario of FIG. 17, $x_{t1,R} = x_{t2,R}$, $y_{t1,R}=y_{t2,R}$, $d_{t1,mR} \ne d_{t2,mR}$, $D_{t1,R} \ne D_{t2,R}$ and, in contrast, $x_{t1,m}=x_{t2,m}$ (or $x_{t1,m} \ne x_{t2,m}$), $y_{t1,m}=y_{t2,m}$ (or $y_{t1,m} \ne y_{t2,m}$).

Hereinafter, the following two types of first LS positioning algorithm and second LS positioning algorithm using Equations (11) and (12) below will be described in detail. In this case, the number of ANs observed from the respective distributed antennas may include one reference AN and $N_j$ neighboring ANs.

First LS Positioning Algorithm

The first LS positioning algorithm may be a method of measuring a position of a final reference point by applying a weight average for location information measured in each antenna. A plurality of TDoA linear equations measured at each antenna may be represented in the form of a matrix as in Equations (13) and (14) below using Equations (11) and (12) above.

$$A_j X_j = K_j (j=1,2) \tag{13}$$

Here, $A_j$ of a size of ($N_j \times 3$), $X_j$ of a size of ($3 \times 1$), and $K_j$ of a size of ($N_j \times 1$) may be represented as follows.

$$A_j = \begin{bmatrix} x_{tj,1}-x_{tj,R} & y_{tj,1}-y_{tj,R} & d_{tj,1R} \\ x_{tj,2}-x_{tj,R} & y_{tj,2}-y_{tj,R} & d_{tj,2R} \\ x_{tj,3}-x_{tj,R} & y_{tj,3}-y_{tj,R} & d_{tj,3R} \\ \vdots \\ x_{tj,Nj}-x_{tj,R} & y_{tj,Nj}-y_{tj,R} & d_{tj,NjR} \end{bmatrix}, X_j = \begin{bmatrix} x \\ y \\ D_{tj,R} \end{bmatrix}, K_j = \begin{bmatrix} k_{tj,1R} \\ k_{tj,2R} \\ k_{tj,3R} \\ \vdots \\ k_{tj,Nj0} \end{bmatrix} \tag{14}$$

As a result, in Equation (14) above, when there is an inverse matrix of $A_j$ (non-singular), a variable $\{x, y, D_{tj,R}\}$ may be calculated using Equation (15) below.

$$X_j = (A_j^T A_j)^{-1} A_j^T K_j \tag{15}$$

In addition, coordinates $X_p = \{x, y\}$ of a final reference point from $X_j$ measured by the two distributed antennas may be calculated as in Equation 16 below.

$$X_p = \beta X_{p1} + (1-\beta) X_{p2} \tag{16}$$

Here, $X_{pj}$ may refer to the position of the reference point acquired by the $j^{th}$ antenna, and, $\beta$ ($0 \le \beta < 1$) may refer to a weight. In this case, the weight $\beta$ may be determined in consideration of at least one various conditions 'a' to 'd' below.

a. Positioning quality indicator (PQI) information of position of AN observed from each antenna: As a PQI level of the observed AN is increased, a higher weight may be applied, and as the PQI level is lowered, a lower weight may be applied.

b. Reference signal strength indicator (RSSI) information measured in each antenna: As an RSSI measured using a received PRS is increased, a higher weight may be applied, and the RSSI is lowered, a lower weight may be applied.

c. Number information of ANs observed each antenna: Depending on the number of observed ANs, a weight may be applied.

d. Topology information of AN observed in each antenna: A topology level of an observed AN may be measured, and a weight may be applied according to the measured topology level. For example, when observed ANs are linearly arranged, a weight at a low level may be applied, and when the observed ANs are non-linearly arranged, a weight at a relatively high level may be applied.

Second LS Positioning Algorithm

The second LS positioning algorithm may be a method of measuring a position of a reference point by combining all TDoAs measured by the respective distributed antennas. A plurality of TDoA linear equations measured by the two distributed antennas may be represented in the form of a matrix as in Equations (17) and (18) below using Equations (11) and (12) above.

$$AX - K \tag{17}$$

Here, A of a size of (($N_1-N_2) \times 4$), X of a size of ($4 \times 1$), and K of a size of (($N_1+N_2) \times 1$) may be represented as follows.

$$A = \begin{bmatrix} x_{t1,1}-x_{t1,R} & y_{t1,1}-y_{t1,R} & d_{t1,1R} & 0 \\ x_{t1,2}-x_{t1,R} & y_{t1,2}-y_{t1,R} & d_{t2,2R} & 0 \\ x_{t1,3}-x_{t1,R} & y_{t1,3}-y_{t1,R} & d_{t3,3R} & 0 \\ \vdots \\ x_{t1,N1}-x_{t1,R} & y_{t1,N1}-y_{t1,R} & d_{t1,N1R} & 0 \\ x_{t2,1}-x_{t2,R} & y_{t2,1}-y_{t2,R} & 0 & d_{t2,1R} \\ x_{t2,2}-x_{t2,R} & y_{t2,2}-y_{t2,R} & 0 & d_{t2,2R} \\ x_{t2,3}-x_{t2,R} & y_{t2,3}-y_{t2,R} & 0 & d_{t2,3R} \\ \vdots \\ x_{t2,N2}-x_{t2,R} & y_{t2,N2}-y_{t2,R} & 0 & d_{t2,N2R} \end{bmatrix}, \tag{18}$$

$$X = \begin{bmatrix} x \\ y \\ D_{t1,R} \\ D_{t2,R} \end{bmatrix}, K = \begin{bmatrix} k_{t1,1R} \\ k_{t1,2R} \\ k_{t1,3R} \\ \vdots \\ k_{t1,N1R} \\ k_{t2,1R} \\ k_{t2,2R} \\ k_{t2,3R} \\ \vdots \\ k_{t2,N2R} \end{bmatrix}$$

As a result, in Equation (18) above, when there is an inverse matrix of $A_j$ (non-singular), a variable $\{x, y, D_{t1,R}, D_{t2,R}\}$ may be calculated as follows $$X = (A^T A)^{-1} A^T K$$

Coordinates $X_p = \{x, y\}$ for the final reference point may be acquired from X.

Embodiment 2

Hereinafter, a method of correcting an absolute position of an ego vehicle using relative position information measured through absolute position information of a neighboring vehicle with an absolute position of high accuracy and relative positioning with the neighboring vehicle when the accuracy of the absolute position of the ego vehicle is low in a sidelink V2X network [hereinafter a correction method 1] and a method of correcting an absolute position of a neighboring vehicle using absolute position information of an ego vehicle with a high confidence level and relative position information measured through relative positioning with the corresponding neighboring vehicle when the confidence level of the absolute position of the neighboring vehicle is low [hereinafter a correction method 2] will be described below in detail.

A method of measuring a relative position of a neighboring UE may include a method of measuring a distance between a positioning UE and the neighboring UE and a method of measuring a direction in which the neighboring UE is positioned based on the positioning UE. The relative position information of the neighboring UE may be effectively used to prevent collision between UEs by recognizing presence of the neighboring UE and ensuring a safe distance between neighboring UEs like a sensor in an environment in which it is difficult to acquire information on the absolute position of the neighboring UE. Here, the UE may be a mobile device, a V2X module, an IoT device, or the like. As such, relative position information of the UE may be usefully used in various systems such as mmWAVE communication, licensed band communication, unlicensed communication, and ITS band communication.

Hereinafter, the correction method 1 and the correction method 2 will be described in detail.

Correction Method 1

The correction method 1 may be a method and procedure for correcting an absolute position of an ego vehicle using relative position information measured through an absolute position of a neighboring vehicle with a high confidence level and relative positioning with the corresponding neighboring vehicle when a confidence level of the absolute position of the ego vehicle is low (or when accuracy is lowered). In this case, the absolute position of the neighboring vehicle and confidence level information on the absolute position may be collected through a safety message collected from the neighboring vehicle, for example, a cooperative awareness message (CAM), basic safety message (BSM), common awareness messages (CPM), or distributed environmental notification messages (DENM).

The correction method 1 may be performed through procedures of STEP 1 to STEP 4 below.

[STEP 1]: When determining that a confidence level of the absolute position of the ego vehicle is lower than a default threshold or a threshold required by a local base service (LBS) in which the ego vehicle participates or is supposed to participate, a higher layer of an ITS stack of the ego vehicle may acquire an absolute position from a neighboring vehicle with a high confidence level for an absolute position and may trigger a relative position positioning operation with the corresponding neighboring vehicle. Hereinafter, the operation performed by the higher layer in STEP 1 will be described in detail. In this case, the default threshold or the threshold required by the LBS may be predefined or may be determined by a location server/LMF and(or) a BS. The higher layer may check whether a vehicle of the higher layer satisfies a condition of relative positioning capability for measuring an angle of arrival (AoA) and a distance between UEs, which are basically required to measure a relative position from the neighboring vehicle through sidelink V2X communication technology. In this case, the relative positioning capability may be evaluated in terms of the number of antennas for AoA measurement and an operational frequency bandwidth for distance measurement. In this case, the condition of the relative positioning capability may be predefined or may be determined by a location server/LMF and(or) a BS. When determining that the vehicle of the higher layer satisfies the condition of the relative positioning capability, the higher layer may perform STEP 2 below.

[STEP 2]: A V2X higher layer may detect a vehicle identification (ID) in that a confidence level for an absolute position from the safety message received from the neighboring vehicle is equal to or greater than a predetermined threshold and reference signal receive power (RSRP) or received signal strength indication (RSSI) measured from the safety message is equal to or greater than a predetermined threshold. Then, the V2X higher layer may request a V2X lower layer to perform a relative position positioning operation with a neighboring vehicle corresponding to the detected vehicle ID. In this case, there may be one or more vehicle IDs detected from the safety message and there may also be one or more neighboring vehicles that participate in relative positioning for correcting the absolute position of the neighboring vehicle.

[STEP 3]: The V2X lower layer may perform relative position positioning with the neighboring vehicle detected and indicated in the V2X higher layer and may transfer the measured relative position information to the higher layer.

[STEP 4]: The V2X higher layer may correct the absolute position of the ego vehicle using the relative position information of the neighboring vehicle, transferred from the V2X lower layer, and the absolute position received from the neighboring vehicle and may transmit the corrected absolute position information of the ego vehicle to the neighboring vehicle through the safety message.

Correction Method 2

The correction method 2 may be a method of correcting an absolute position of a neighboring vehicle using relative position information measured through absolute position information of an ego vehicle with a high confidence level and relative positioning with the corresponding neighboring vehicle when a confidence level of the absolute position of the neighboring vehicle is low. In this case, the neighboring vehicle may collect the absolute position information of the ego vehicle and confidence level information on the absolute position of the ego vehicle through a safety message collected from the neighboring vehicle, for example, a cooperative awareness message (CAM), basic safety message (BSM), common awareness messages (CPM), or distributed environmental notification messages (DENM).

The correction method 2 may be performed through procedures of STEP 1 to STEP 4 below.

[STEP 1]: When determining that a confidence level of the absolute position of the neighboring vehicle that performs or is supposed to perform an LBS with the ego vehicle is lower than a default threshold or a threshold required by the LBS, a higher layer of an ITS stack of the ego vehicle may trigger a relative position positioning operation between the corresponding neighboring vehicle and the ego vehicle with a high confidence level for an absolute position. Hereinafter, the operation performed by the higher layer in STEP 1 will be described in detail. The default threshold and the threshold required by the LBS may be predefined or may be determined by a location server/LMF and(or) a BS. The higher layer may check whether the ego vehicle satisfies a condition of relative positioning capability for measuring an AoA and a distance between UEs, which are basically required to measure a relative position from the neighboring vehicle through sidelink V2X communication technology. In this case, the relative positioning capability may be evaluated in terms of the number of antennas for AoA measurement and an operational frequency bandwidth for distance measurement. The higher layer may also check whether the neighboring vehicle satisfies the condition of the relative positioning capability with reference to the relative positioning capability provided from the neighboring vehicle. Such provision of information on the relative positioning capability from the neighboring vehicle may be determined by mutual request and agreement between the ego vehicle and the neighboring vehicle. In this case, the condition of the relative positioning capability may be predefined or may be determined by a location server/LMF and(or) a BS. The higher layer may trigger the relative positioning operation for the neighboring vehicle of the ego vehicle through two methods to be described below. In a first method, the higher layer may control the ego vehicle to perform relative positioning for the neighboring vehicle based on determination that the relative positioning capability of the neighboring vehicle that participates or is supposed to participate in the LBS does not satisfy a preconfigured condition. In this case, the higher layer may select a neighboring vehicle in which a confidence level for an absolute position is low and an RSRP or RSSI is higher than a predetermined threshold, as a neighboring vehicle that is supposed to perform relative positioning. A second method may be a method of requesting another neighboring vehicle to perform relative positioning instead of the subject neighboring vehicle based on that the higher layer of the ITS stack of the neighboring vehicle determines that a confidence level for the absolute position of the neighboring vehicle is lower than a default threshold or a threshold predefined according to a LBS and the relative positioning capability does not satisfy a preconfigured condition. In this case, the higher layer of the ITS stack of the neighboring vehicle may select another neighboring vehicle in which a confidence level for an absolute position is higher than a preconfigured threshold and an RSRP or RSSI is equal to or greater than a predetermined level, as a vehicle that is supposed to perform relative positioning instead of the subject neighboring vehicle.

[STEP 2]: A V2X higher layer may acquire a vehicle ID of the neighboring vehicle that requests correction of the absolute position or the neighboring vehicle, the absolute position of which needs to be corrected, from STEP 1 and may then request the V2X lower layer to perform the relative positioning operation through V2X communication with the corresponding neighboring vehicle. In this case, there may be one or more detected vehicle IDs and there may also be one or more neighboring vehicles that participate in relative positioning.

[STEP 3]: The V2X lower layer may perform relative position positioning with the neighboring vehicle corresponding to the vehicle ID detected by the V2X higher layer and may transfer the measured relative position information to the higher layer.

[STEP 4]: The V2X higher layer may correct the absolute position of the neighboring vehicle using the relative position information transferred from the V2X lower layer and the absolute position information of the ego vehicle. The V2X higher layer may measure the confidence level for the absolute position of the neighboring vehicle based on the ego vehicle. Then, the V2X higher layer may transmit the absolute position information of the neighboring vehicle, corrected in the ego vehicle, and information on the confidence level measured in the ego vehicle to the neighboring vehicle through the safety message with the vehicle ID. In addition, information on the relative position of the neighboring vehicle, measured in the ego vehicle, may be used to ensure a safe distance with the neighboring vehicle.

As described above, the correction methods according to embodiment 2 may relate to a method and procedure for correcting an absolute position of a vehicle using relative position information acquired through absolute position information of a detected neighboring vehicle and relative positioning with the neighboring vehicle by detecting the neighboring vehicle with an absolute position of high accuracy when the accuracy of an absolute position of the vehicle is low in a sidelink V2X network and may provide the following advantages.

The correction method 1 may relate to a method and procedure for correcting an absolute position of an ego vehicle using relative position information acquired through absolute position information of a neighboring vehicle with a high confidence level and relative positioning with the corresponding neighboring vehicle when a confidence level for an absolute position of the ego vehicle and may provide positioning performance with high accuracy by correcting the absolute position of the ego vehicle through cooperation with the neighboring vehicle even if there is no neighboring infrastructure.

The correction method 2 may relate to a method and procedure for correcting an absolute position of a neighboring vehicle using relative position information acquired through absolute position information of the ego vehicle with a high confidence level and relative positioning with the corresponding neighboring vehicle when a confidence level for the absolute position of the neighboring vehicle is low and may advantageously improve the accuracy for a safe distance with the neighboring vehicle by the ego vehicle. The ego vehicle may provide corrected absolute position information of the neighboring vehicle to the neighboring vehicle, and thus the neighboring vehicle may advantageously correct absolute position with high accuracy.

Figure 18:
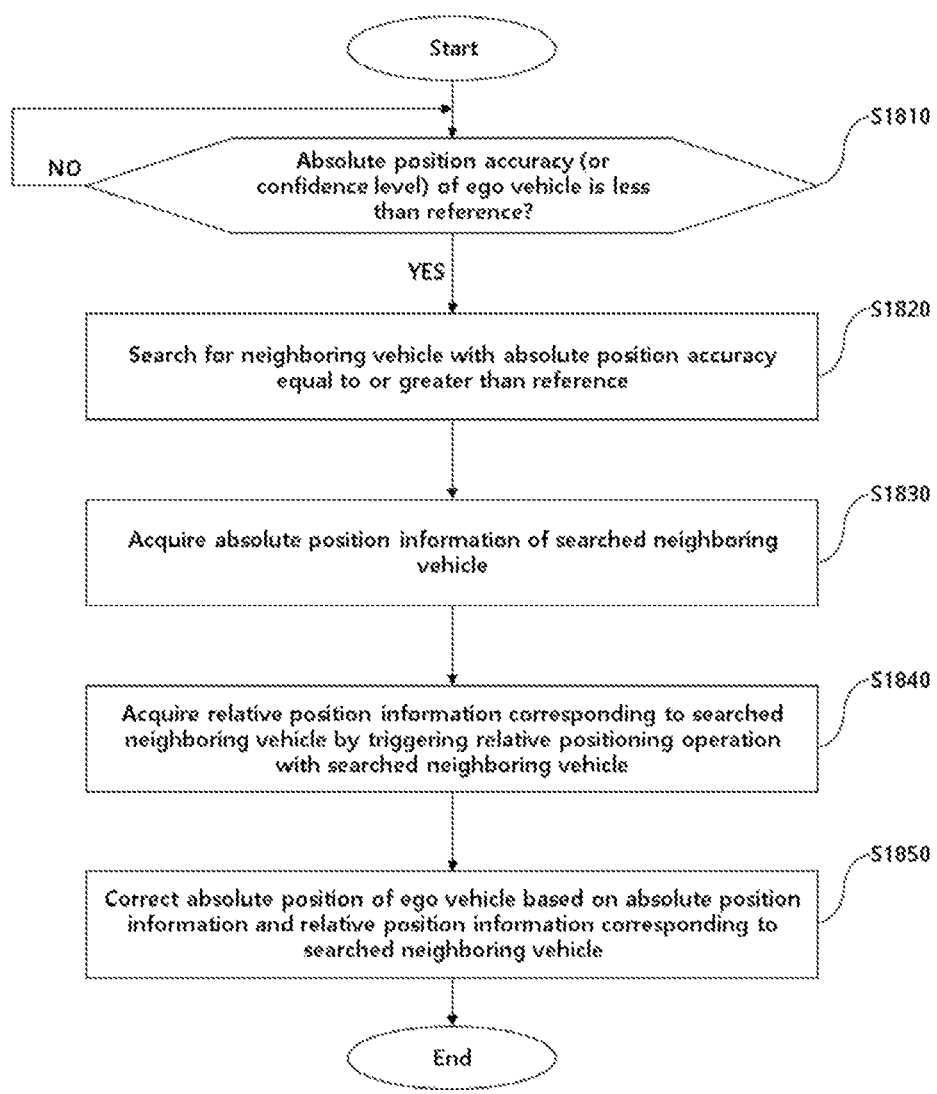
FIG. 18 is a diagram for explaining a method of correcting an absolute position of a vehicle in a sidelink V2X network according to an embodiment of the present disclosure.

FIG. 18 is a diagram for explaining a method of correcting an absolute position of a vehicle in a sidelink V2X network according to an embodiment of the present disclosure.

Referring to FIG. 18, an ego vehicle may determine whether the accuracy (or a confidence level) of an absolute position of the ego vehicle is less than a predetermined reference (S1810). Here, the reference may be a default threshold or a threshold required by a local base service (LBS) in which the vehicle participates or is supposed to participate.

As a determination result, when the accuracy of the absolute position of the ego vehicle is equal to or less than the reference, the ego vehicle may search for a neighboring vehicle with absolute position accuracy equal to or greater than the threshold (S1820).

In this case, the ego vehicle may check whether the accuracy (or a confidence level) of the absolute position of the corresponding neighboring vehicle is equal to or greater than a reference based on a safety message received from the neighboring vehicle. The ego vehicle may identify a neighboring vehicle of which reference signal receive power (RSRP) or received signal strength indication (RSSI), i.e., received signal quality measured based on the safety message is equal to or greater than a predetermined threshold. The ego vehicle may search for a neighboring vehicle, absolute position information or relative position information of which is to be acquired, for example, a vehicle ID of the neighboring vehicle based on the accuracy (or a confidence level) and received signal quality for the absolute position of the neighboring vehicle. In this case, a plurality of vehicle IDs may be searched for by the ego vehicle.

When a neighboring vehicle, the absolute position accuracy of which is equal to or greater than a reference, is searched, the ego vehicle may acquire absolute position information from the searched neighboring vehicle (S1830).

When the neighboring vehicle, the absolute position accuracy of which is equal to or greater than the reference, is searched the ego vehicle may trigger a relative positioning operation with the searched neighboring vehicle and may acquire relative position information corresponding to the searched neighboring vehicle (S1840).

Here, whether the ego vehicle satisfies a condition of relative positioning capability for measuring an angle of arrival (AoA) and a distance between UEs, which are basically required to measure a relative position of the searched neighboring vehicle, may be checked through sidelink V2X communication technology. In this case, the relative positioning capability may be evaluated in terms of the number of antennas for AoA measurement and an operational frequency bandwidth for distance measurement.

The ego vehicle may correct the absolute position thereof based on absolute position information and relative position information corresponding to the searched neighboring vehicle (S1850).

In this case, the ego vehicle may also transmit the corrected absolute position information thereof to the neighboring vehicle.

Figure 19:
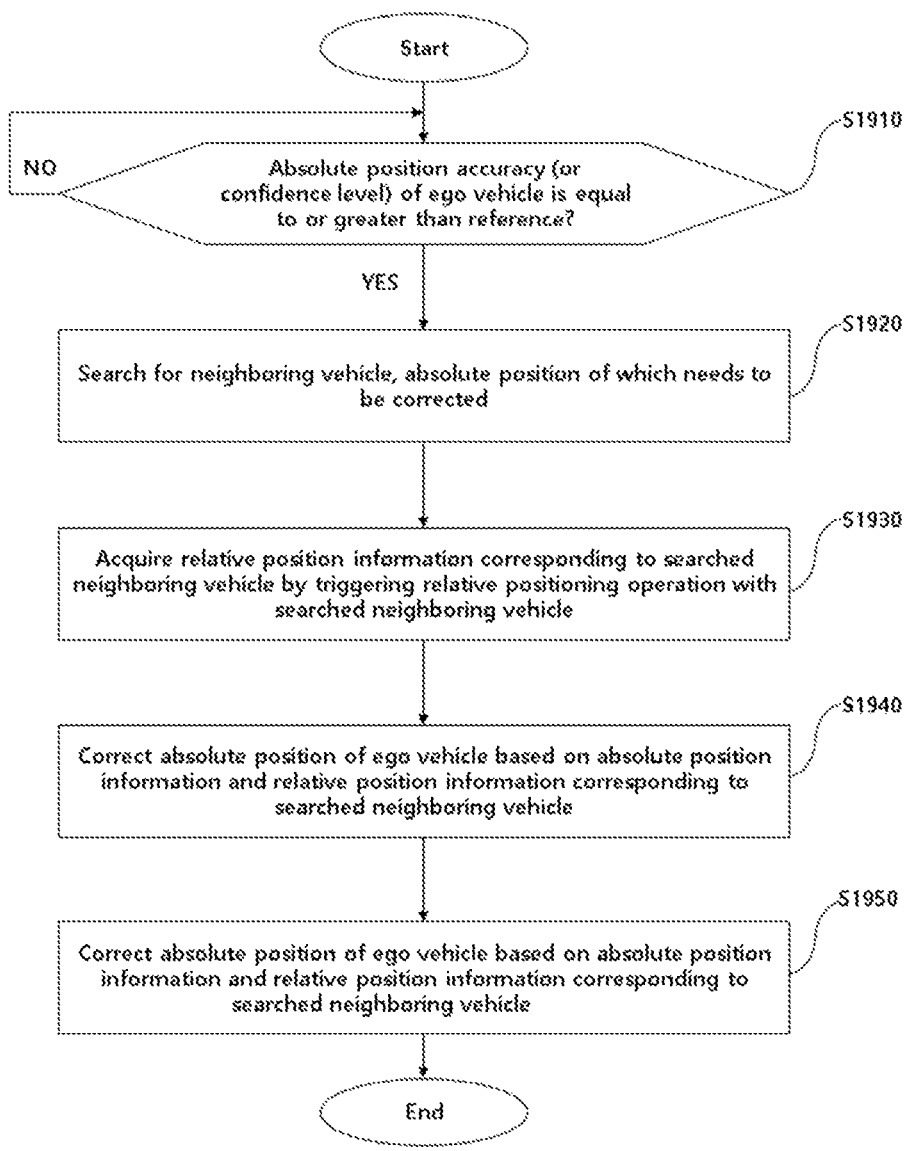
FIG. 19 is a diagram for explaining a method of correcting an absolute position of a vehicle in a sidelink V2X network according to another embodiment of the present disclosure.

FIG. 19 is a diagram for explaining a method of correcting an absolute position of a vehicle in a sidelink V2X network according to another embodiment of the present disclosure.

Referring to FIG. 19, the ego vehicle may determine whether the accuracy (or a confidence level) thereof is equal to or greater than a predetermined reference (S1910). Here, the reference may be a default threshold or a threshold required by a local base service (LBS) in which the vehicle participates or is supposed to participate.

As a determination result, when the accuracy of the absolute position of the ego vehicle is equal to or less than the reference, the ego vehicle may search for a neighboring vehicle, an absolute position of which needs to be corrected (S1920). Here, the neighboring vehicle, the absolute position of which needs to be corrected, may be a neighboring vehicle, an absolute position accuracy is less than a reference, and(or) a neighboring vehicle that requests the ego vehicle to correct the absolute position.

In this case, the ego vehicle may check the accuracy (or a confidence level) of the absolute position of the corresponding neighboring vehicle based on a safety message received from the neighboring vehicle.

The ego vehicle may identify a neighboring vehicle of which reference signal receive power (RSRP) or received signal strength indication (RSSI), i.e., received signal quality measured based on the safety message received from the neighboring vehicle is equal to or greater than a predetermined threshold. The ego vehicle may search for a neighboring vehicle, an absolute position of which needs to be corrected, e.g., a vehicle ID of the neighboring vehicle, based on the accuracy of the absolute position of the neighboring vehicle, received signal quality, and(or) whether the absolute position is requested to be corrected. Here, a plurality of vehicle IDs may be searched for.

When the neighboring vehicle, the absolute position of which needs to be corrected, is searched, the ego vehicle may trigger the relative positioning operation with the searched neighboring vehicle and may acquire relative position information corresponding to the searched neighboring vehicle (S1930).

Here, whether the ego vehicle satisfies a condition of relative positioning capability for measuring an angle of arrival (AoA) and a distance between UEs, which are basically required to measure a relative position of the searched neighboring vehicle, may be checked through sidelink V2X communication technology. In this case, the relative positioning capability may be evaluated in terms of the number of antennas for AoA measurement and an operational frequency bandwidth for distance measurement.

The ego vehicle may correct the absolute position of the searched neighboring vehicle based on relative position information corresponding to the searched neighboring vehicle and absolute position information of the ego vehicle (S1940).

The ego vehicle may transmit information on the corrected absolute position to the corresponding neighboring vehicle through a safety message (S1950). In this case, the ego vehicle may also transmit information on the accuracy (or a confidence level) of the corrected absolute position in the safety message to the neighboring vehicle.

Embodiment 3

Figure 20:
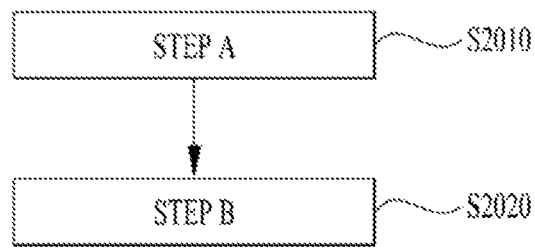
FIG. 20 is a flowchart for explaining a network-based positioning method according to an embodiment.

FIG. 20 is a flowchart for explaining a network-based positioning method according to an embodiment.

Referring to FIG. 20, the network-based positioning method may include STEP A S2010 and STEP B S2020.

A network according to an embodiment may include a location server, a location measurement function (LMF), and a BS which communicate with a UE through a Uu interface and perform positioning of the UE. For example, the UE may be provided in a vehicle, and a plurality of antennas—hereinafter referred to as a distributed antenna for convenience of description—which is connected to the UE and is distributed may be mounted in the vehicle. A specific position in the vehicle may be predefined as a reference point and may be configured in a vehicle UE. For example, the reference point may be defined and configured as the middle of the vehicle or the center point of a front bumper of the vehicle, but this is only an embodiment, and the location of the reference point may be defined and configured differently according to a design of those skilled in the art. The reference point may be configured to a fixed value, but the location of the actual reference point may be changed according to movement of a UE (i.e., a vehicle). Hereinafter, the location of the reference point may refer to the current location of the UE (or a vehicle).

For example, there may be one reference point in a vehicle, but this is only an embodiment, and a plurality of reference points may be arbitrarily defined and configured based on the type of the vehicle according to a design of those skilled in the art.

Hereinafter, STEP A S2010 and STEP B S2020 will be described in more detail.

STEP A S2010

The network may receive distributed antenna-related information from the UE.

The distributed antenna-related information may include at least one of RSTD-related information measured in each distributed antenna, signal quality information measured in each distributed antenna, or relative position-related information of each distributed antenna based on the reference point.

The signal quality information may include received signal received power (RSRP) and/or a received signal strength indicator (RSSI).

The network may receive at least one of RSTD-related information, signal quality information, or relative position-related information from the UE through a predetermined control message, but this is merely an embodiment, and at least one of RSTD-related information, signal quality information, or relative position-related information may be included in one side of a data message and may be received. For example, the control message may be a positioning message, but is not limited thereto.

The network may receive distributed antenna-related information of each distributed antenna through one message, but this is merely an embodiment, and the network may also receive distributed antenna-related information through a plurality of messages.

The RSTD may be measured based on a specific signal received from at least one anchor node (AN) related to the corresponding distributed antenna. Here, the specific signal may include at least one of a positioning reference signal (PRS), a cell reference signal (CRS), a demodulation reference signal (DM-RS), or a discover or ranging signal.

The AN may include at least one of a BS, a road side unit (RSU), a mobile UE, an IoT device, or a vehicle.

According to an embodiment, the UE may select an AN, an RSTD of which is to be measured, based on quality measurement information (e.g., RSRP and/or RSSI) of a signal (e.g., a PRS) received from the AN in each distributed antenna.

The UE may measure a time of arrival (ToA) using the signal (e.g., a PRS) received from the AN in each distributed antenna and may measure a RSTD (or a time difference of arrival (TDoA)) using a time difference of a ToA between a reference anchor node (AN) and a neighboring AN. Here, the reference AN may be a serving cell, but is not limited thereto, and a neighboring cell may be a reference AN.

The network may previously transmit an AN configuration including the reference AN and the neighboring AN and information related thereto to the UE.

According to an embodiment, the UE may measure the RSRP using the PRS received in each distributed antenna and may then report the measured RSRP information to the network. In this case, the network may finally determine an AN that is supposed to participate in UE positioning based on the reported RSRP information.

For RSTD measurement for a distributed antenna and signal quality measurement for each AN, each AN including a serving cell and/or a neighboring cell may transmit a PRS, and in this case, collision between PRSs transmitted by the respective ANs may be prevented or minimized using a PRS, the orthogonality of which is ensured, such as a comb type.

STEP B S2020

The network may determine a UE-related position based on at least one of the RSTD-related information or the relative position-related information, received from the UE.

Here, the UE-related position may be a position of each distributed antenna and/or a position of the reference point.

For example, the network may measure an OTDoA based on the RSTD-related information received for each respective distributed antenna and may determine the position of each distributed antenna.

In another example, the network may finally determine the position of the UE based on the location information of each distributed antenna and the relative position information for each distributed antenna based on the reference point, determined based on the RSTD-related information received for each respective distributed antenna.

The network may transmit information on a position of each distributed antenna to the UE. In this case, the UE may finally determine the UE (i.e., the position of the reference point) based on the information of the position of each distributed antenna and the relative position information of each UE based on the reference point.

The network may also transmit the location information of the reference point, which is the finally determined location information of the UE, to the UE. In this case, the UE may determine the position of each distributed antenna based on the received location information and reference point.

The UE-related location information provided to the UE by the network may be determined based on positioning capability of the UE and positioning precision (or accuracy) required by the corresponding UE (or a vehicle).

For example, when the UE requires location information with very high accuracy, the network may determine the position of the reference point and may provide the determined position to the UE, and when the UE requires positioning accuracy at a low level, the network may determine the position of each distributed antenna and may provide the determined position to the UE.

Hereinafter, for convenience of description, a positioning mode in which a reference point position is determined and is provided to a UE will be referred to as a step 1 positioning mode, and a positioning mode in which a position of each distributed antenna is determined and is provided to the UE will be referred to as a step 2 positioning mode.

Figure 21:
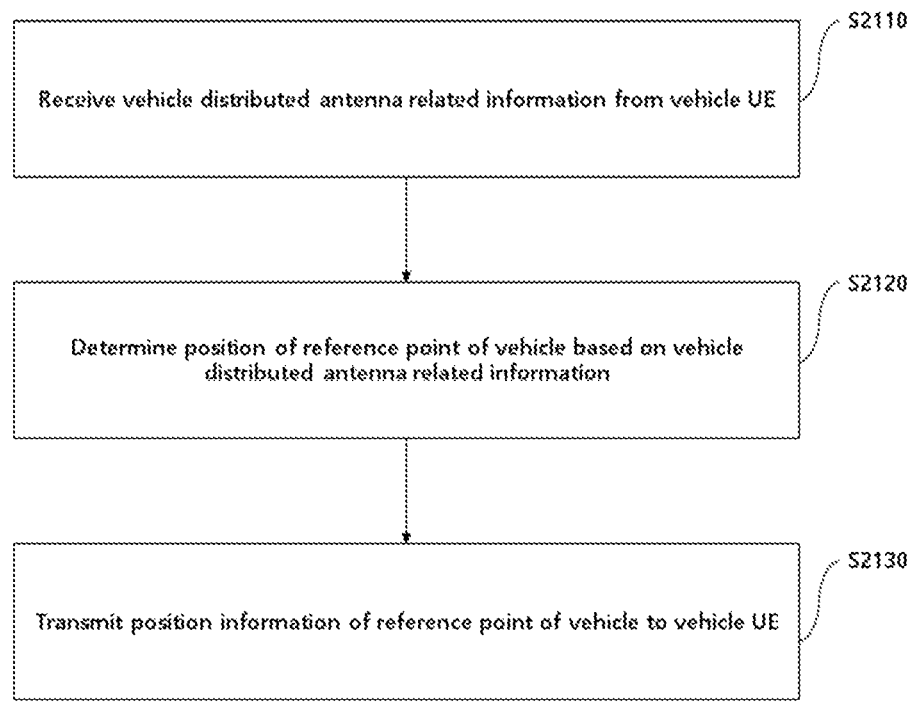
FIG. 21 is a flowchart for explaining a network operation in the step 1 positioning mode according to an embodiment.

FIG. 21 is a flowchart for explaining a network operation in the step 1 positioning mode according to an embodiment.

Referring to FIG. 21, a network may receive vehicle distributed antenna-related information from a vehicle UE (S2210).

Here, the vehicle distributed antenna information may include RSTD information measured in each distributed antenna and relative position information of each distributed antenna based on the reference point.

The network may determine the position of the reference point of the vehicle based on the vehicle distributed antenna-related information (S2120).

The network may transmit location information of the determined reference point to the vehicle UE (S2130).

Figure 22:
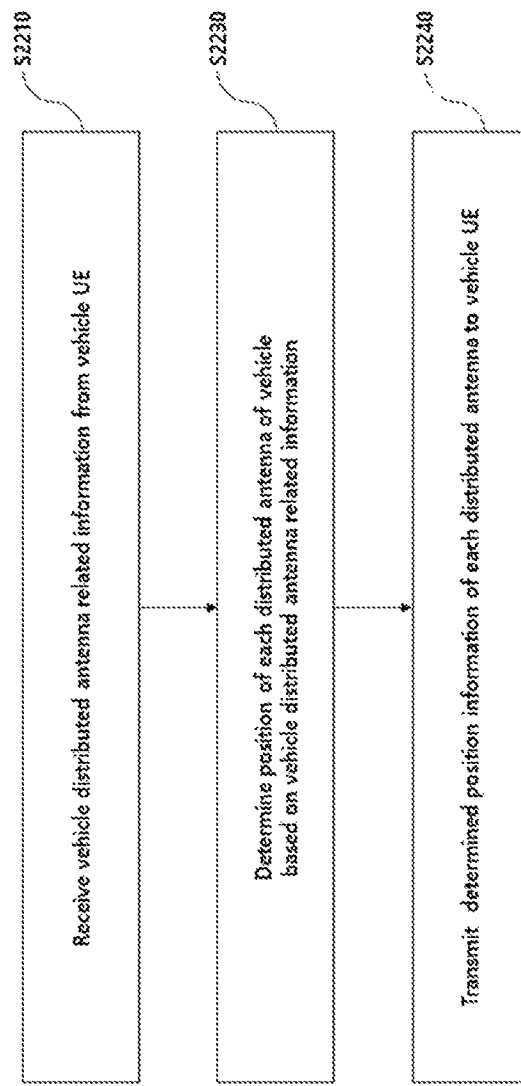
FIG. 22 is a flowchart for explaining a network operation in the step 2 positioning mode according to an embodiment.

FIG. 22 is a flowchart for explaining a network operation in the step 2 positioning mode according to an embodiment.

Referring to FIG. 22, the network may receive vehicle distributed antenna-related information from a vehicle UE (S2210).

Here, the vehicle distributed antenna information may include RSTD information measured in each distributed antenna and relative position information of each distributed antenna based on the reference point.

The network may determine a position of each distributed antenna of a vehicle based on the vehicle distributed antenna-related information (S2220).

The network may transmit the determined position information of each distributed antenna to the vehicle UE (S2230).

In this case, the vehicle UE may receive the position information of each distributed antenna and may then finally determine the position of the reference point using the relative position information of each distributed antenna based on the reference point.

Network-Based OTDoA Positioning Method

Hereinafter, a network-based OTDoA positioning method may be classified into the step 2 positioning mode and the step 1 positioning mode and will be described in detail.

<Step 2 Positioning Mode>

In the step 2 positioning mode, the network may receive the RSTD value and RSRP measured in each antenna of the distributed antenna vehicle and may measure the position of each antenna. In contrast, the distributed antenna vehicle may finally measure the position of the reference point of the vehicle using the location information of each antenna and the relative position information of each antenna based on the reference point, received from the network. As such, in the step 2 positioning mode, the network and the vehicle may sequentially perform operations related to positioning.

The RSTD measured in each distributed antenna, reported from the vehicle, may be used for OTDoA positioning for a position of each antenna, and in this case, related information that is previously transferred from the network for RSTD measurement may be as follows.

1) The number of distributed antennas to be measured and reported by the vehicle: The number of antennas, a RSTD of which needs to be measured by the vehicle, may be determined based on information on whether to support the distributed antenna of the vehicle and information on the number of antennas to be supported, which are acquired from the vehicle by the network prior to the positioning operation. In this case, at least one distributed antenna may be configured. In addition, determination of the number of antennas, the RSTD of which needs to be measured by the vehicle, may be requested to the network in consideration of the quality of a location based service (LBS) provided by the vehicle. For example, when the vehicle operates an LBS that requires position measurement with very high accuracy, the vehicle may request the network to measure a position for one or more distributed antennas, and in this case, the maximum number of antennas to be requested may be predefined or may be configured through signaling between the network and the vehicle UE.

2) Unique identification (ID) information for distinguishing between distributed antennas: A unique ID may be predefined to identify the position of an antenna in a vehicle. For example, respective antennas positioned on a roof of the vehicle, a front bumper of the vehicle, and a rear bumper of the vehicle may be distinguished therebetween by previously assigning different IDs thereto. The unique ID may be temporarily issued by the network. In this case, the temporarily issued unique ID may be effectively used until a reference point position is finally calculated using the location information of an antenna from the network by the vehicle. For example, the network may assign an arbitrary ID to each distributed antenna, the vehicle may match the position of the distributed antenna with an ID assigned for each distributed antenna, may match an RSTD measured for each distributed antenna with the corresponding ID, and may report the matched information to the network. Then, the network may measure the position of an antenna for each antenna ID and may transfer the measurement result to the vehicle using the same ID. In this case, the network may not need to know matching information between the position of the vehicle antenna and an ID. Then, the vehicle may distinguish between the measured positions of the antennas through the ID and may finally measure the position of the reference point.

3) The number of RSTDs to be measured in each antenna: This may be the same as the number of neighboring ANs except for a reference AN, and in this case, the number of RSTDs measured by the respective distributed antennas may not be changed or may be changed. ANs referenced by the respective distributed antennas may be the same or different, and when the ANs are different, reference AN information of each distributed antenna may be provided to the network.

The vehicle may measure an RSTD using one or more distributed antennas and may then transfer the measurement result to the network, and a transmission operating method related thereto may be as follows.

According to an embodiment, the vehicle may transfer RSTD information measured in each of a plurality of distributed antennas to the network using one distributed antenna, and in this case, the distributed antenna used to transmit the RSTD information may be a reference antenna and may be previously selected among a plurality of distributed antennas. The reference antenna may be selected by the UE or the network.

According to another embodiment, the vehicle may transmit the RSTD information measured in the corresponding distributed antenna using the distributed antenna that participates in RSTD measurement.

The vehicle may measure the RSRP in each distributed antenna, and the RSRP measured in each distributed antenna may be used to select an AN that is supposed to finally participate in positioning. In this case, the network may transmit information related to the number of distributed antennas, a RSRP of which needs to be measured and reported and the number of RSRPs that need to be measured in a distributed antenna as a reporting target, to the vehicle. For example, only an AN in which the measured RSRP is equal to or greater than a predetermined reference may be selected to participates in final positioning. In another example, an AN, which is up to the top $N^{th}$ in the highest order of RSRP measured from the corresponding distributed antenna, may be selected to participate in final positioning. Here, N may be a natural equal to or greater than 1 and may be configured by the network.

The location information of each distributed antenna, transferred to the vehicle from the network, may be used for position measurement based on the reference point by the vehicle UE, and in this case, a distributed antenna of the vehicle, indicated by the location information, may be identified through a unique ID mapped to the aforementioned distributed antenna. Identification of the location information of each distributed antenna through the unique ID may be required to finally measure the position of the reference point using the relative position information of each distributed antenna based on the reference point by the vehicle.

The final position of the reference point of the vehicle may be determined as an average of a plurality of reference point positions that are measured using the location information of each distributed antenna and relative position information of each distributed antenna based on the reference point, received from the network. That is, the vehicle may calculate a final reference point position by averaging an average value of reference points of respective distributed antennas.

<Step 1 Positioning Mode>

In the step 1 positioning mode, the network may receive RSTD information and RSRP information measured in each distributed antenna based on the reference point and relative position information of each antenna based on the reference point, from the vehicle UE and may measure (or determine) the position of the reference point. The distributed antenna vehicle may receive location information for the reference point of the vehicle from the network. That is, position measurement for the reference point of the vehicle may be completely performed by the network differently from the step 2 positioning mode.

The RSTD information measured in each distributed antenna, reported from the vehicle, may be used for OTDoA positioning required to determine the position of the reference point. In this case, information that is previously transferred to the vehicle form the network for RSTD measurement in the vehicle may be as follows.

1) The number of distributed antennas to be measured and reported by the distributed antenna vehicle: For example, the number of distributed antennas, an RSTD of which needs to be measured by the vehicle, may be determined based on information on whether to support a distributed antenna of the vehicle and(or) information on the number of distributed antennas mounted in the vehicle, which are acquired from the vehicle by the network prior to the positioning operation, similarly to the step 2 positioning mode. In another example, the vehicle may request the number of distributed antennas, an RSTD of which needs to be measured, to the network in consideration of LBS quality that needs to be provided by the vehicle or may determine the number of distributed antennas, an RSTD of which needs to be measured, based on information on LBS quality received from the vehicle by the network.

2) Unique ID information for distinguishing between distributed antennas: A unique ID may be predefined to uniquely identify a distributed antenna mounted in the corresponding vehicle similarly to the step 2 positioning mode. The unique ID may be temporarily issued by the network. That is, whenever a positioning process between the vehicle and the network is performed, a unique ID for a distributed antenna may be dynamically assigned.

3) Information on a relative position and directionality for a reference point of each distributed antenna: The network may not be capable of knowing the current driving state of the vehicle, and thus the vehicle may provide the directionality of the relative position of each distributed antenna based on the reference point to the network. For example, from FIG. 13 and Equation (2), the relative position information of each distributed antenna may have a sign "+" or "−" as follows.

$(d_j \cos(\emptyset+\theta_j), d_j \sin(\emptyset+\theta_j))$ $(d_j \cos(\emptyset+\theta_j), -d_j \sin(\emptyset+\theta_j))$ $(-d_j \cos(\emptyset+\theta_j), d_j \sin(\emptyset+\theta_j))$ $(-d_j \cos(\emptyset+\theta_j), -d_j \sin(\emptyset+\theta_j))$ The vehicle may provide relative position information of a distributed antenna based on the reference point in consideration of vehicle heading of each distributed antenna, to the network.

The relative position of each distributed antenna based on the reference point may be measured by the vehicle and may then be reported to the network, but this is merely an embodiment, and in another example, $\{\emptyset, \theta_j, d_j\}$ information measured in each distributed antenna may be provided to the network by the vehicle, and the relative position information of each distributed antenna may be calculated by the network from Equation (2).

4) The number of RSTDs to be measured in each distributed antenna: This may be the same as the number of neighboring ANs except for a reference AN. In this case, the number of RSTDs measured in respective distributed antennas may not be changed or may be changed. That is, the number of ANs to be monitored for RSTD measurement in the respective distributed antennas may be different. ANs (i.e., reference AN) referenced by the respective distributed antennas may be the same or different, and when the ANs are different, reference AN information of each distributed antenna may be provided to the network.

The RSRP measured in each distributed antenna may be used to select an AN that participates in final positioning, and in this case, information that needs to be previously transferred to the vehicle from the network for RSTD measurement may include information on the number of distributed antennas and information on the number of RSRPs that need to be measured in each distributed antenna, which need to be measured and reported by the distributed antenna vehicle.

The network may measure the position of the reference point by applying relative position information of the reference point of each distributed antenna reported from the vehicle, RSTD information, and various algorithms for the RSRP information.

The location information of each distributed antenna may or may not be calculated during a procedure of measuring the reference point position.

When the vehicle requests the location information of each distributed antenna as well as location information for the reference point, the network may also provide the location information of each distributed antenna with the reference point position.

<Comparison of Main Feature and Effect Between Step 2 Positioning Mode and Step 1 Positioning Mode>

Hereinafter, comparison between the features of the network-based OTDoA measuring methods for the aforementioned two positioning modes will be described in terms of signaling overhead, positioning performance of a reference point, and an operating method.

Signaling Overhead: In relation to positioning related signaling transferred to the network from the vehicle, the step 2 positioning mode may not provide relative position information for the reference point of each distributed antenna, and thus may have lower signaling overhead than the step 1 positioning mode. In contrast, in relation to positioning related signaling transferred to the vehicle from the network, the step 1 positioning mode may provide only location information of a reference point of the vehicle, and thus may have lower signaling overhead than the step 2 positioning mode.

Positioning performance for a reference point position: The step 1 positioning mode in which the network measures a reference point position of a reference point position by integrally using information measured in each distributed antenna may provide more accurate positioning performance than the step 2 positioning mode in which the vehicle receives location information of each distributed antenna from the network and then finally measures a reference point position based on the location information of each distributed antenna.

Operating Method: The step 2 positioning mode and the step 1 positioning mode may be separately applied depending on a positioning operation method of the vehicle. When positioning related signaling overhead transferred to the vehicle from the network is more important than positioning related signaling overhead transferred to the network from the vehicle, the step 2 positioning mode may be applied. In contrast, when positioning related signaling overhead transferred to the network from the vehicle is more important than positioning related signaling overhead transferred to the vehicle from the network, the step 1 positioning mode may be applied. A positioning mode may be determined with regard to positioning accuracy required by the vehicle. For example, when the vehicle requires location information with very high accuracy (e.g., accuracy equal to or greater than a predetermined reference), the step 1 positioning mode may be applied, and otherwise, the step 2 positioning mode may be applied.

In terms of an effect, in the proposed step 2 positioning mode, the network may measure the position of each distributed antenna, and then the vehicle may finally measure the reference point position using the measured position of the distributed antenna, and thus the step 2 positioning mode may have an advantage in that positioning related signaling information transmitted through uplink and downlink between the network and the vehicle is effectively distributed. The step 2 positioning mode may be effectively applied when the vehicle operates a service using location information of a distributed antenna. In contrast, in the proposed step 1 positioning mode, the network may perform positioning on the reference point position of the vehicle, and the vehicle may calculate the position of each distributed antenna using a reference point position and a relative position for the reference point of each distributed antenna. Thus, in the step 1 positioning mode, the reference point position of the vehicle may be measured by integrally using information measured by each distributed antenna, and thus it may be possible to measure a position with very high accuracy.

Figure 23:
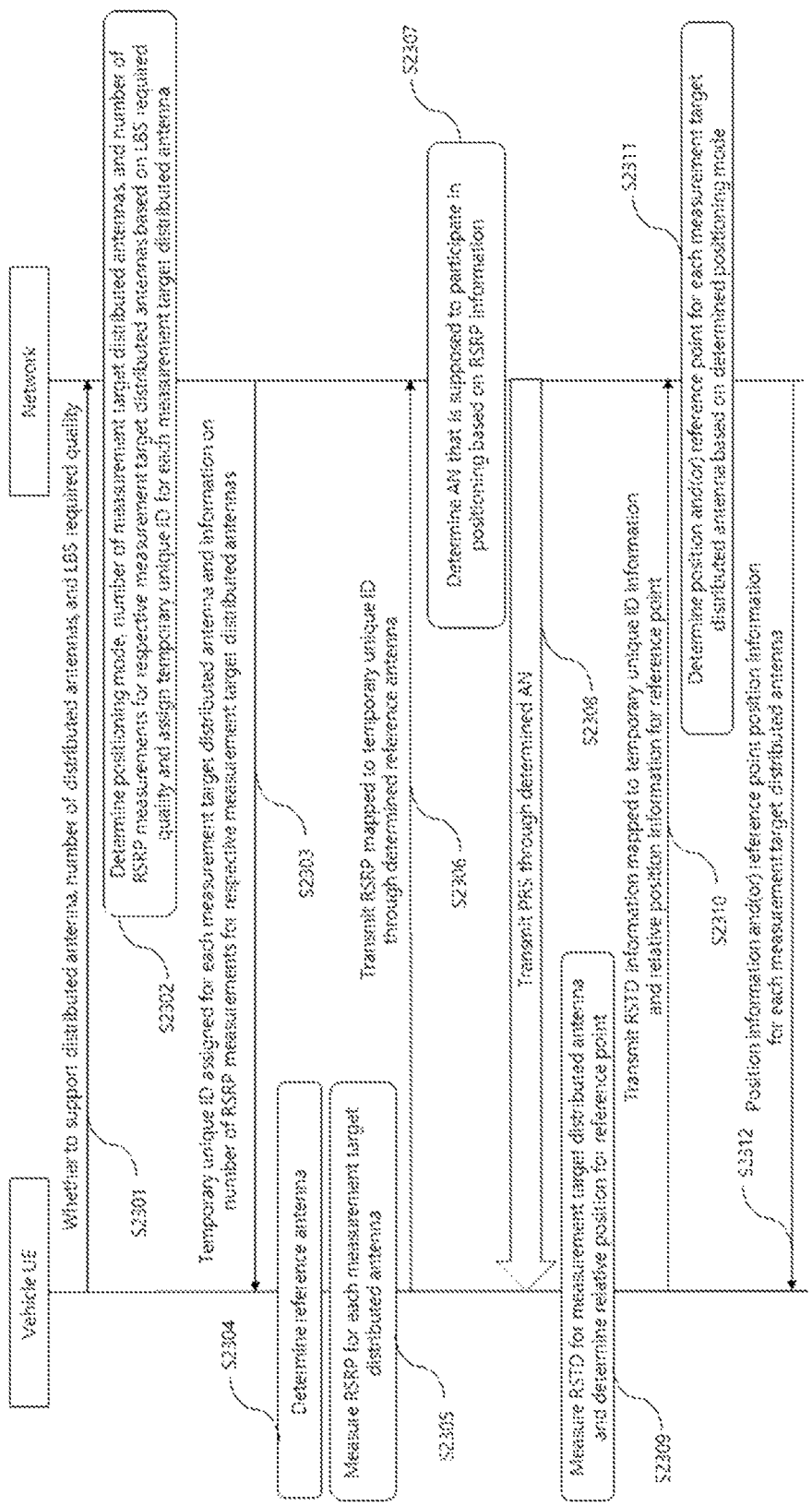
FIG. 23 is a flowchart for explaining a network-based positioning method according to an embodiment.

FIG. 23 is a flowchart for explaining a network-based positioning method according to an embodiment.

Referring to FIG. 23, a vehicle UE may transmit information on whether to supply a distributed antenna, information on the number of distributed antennas, and information on LBS required quality information to the network (S2301).

The network may determine a positioning mode, the number of distributed antennas as an RSTD measurement target, and the number of RSRP measurements for the respective measurement target distributed antennas based on the LBS required quality information of the vehicle, and may assign a temporary unique ID for each measurement target distributed antenna (S2302).

The network may transmit information on the temporary unique ID assigned for each measurement target distributed antenna and information on the number of RSRP measurements for the respective measurement target distributed antennas to the vehicle UE (S2303).

The vehicle UE may determine any one of the measurement target distributed antennas as a reference antenna (S2304). For example, the vehicle UE may determine an antenna with the best channel environment among the measurement target distributed antennas as the reference antenna.

The vehicle UE may perform RSRP measurement of the corresponding AN depending on the number of RSRP measurements for the respective measurement target distributed antennas (S2305).

The vehicle UE may transmit RSRP information mapped to the temporary unique ID to the network through the determined reference antenna (S2306).

The network may determine an AN that is supposed to participate in positioning based on the RSRP information (S2307). In this case, transmission of a PRS may be initiated through the determined AN (S2308).

The vehicle UE may measure a RSTD for each measurement target distributed antenna and may determine a relative position of the measurement target distributed antenna based on a reference point (S2309).

The vehicle UE may transmit RSTD information mapped to temporary unique ID information and the relative position information of the measurement target distributed antenna based on the reference point, to the network (S2310).

The network may determine the position and(or) the reference point position for each measurement target distributed antenna based on the determined positioning mode (S2311).

The network may transmit the location information and (or) reference point location information for each measurement target distributed antenna, to the vehicle UE (S2312).

The vehicle UE may determine the position of the reference point based on the location information for each measurement target distributed antenna or may determine the position of each distributed antenna based on the reference point location information.

The network according to another embodiment of the present disclosure may also determine a positioning mode based on the state of the network. For example, the state of the network may include a network processing load state, uplink/downlink signaling overhead, and a service policy, but is not limited thereto.

The network according to another embodiment of the present disclosure may transmit information on the number of RSSI measurements for respective measurement target distributed antennas to the vehicle UE, and the vehicle UE may measure RSSI for each measurement target distributed antenna and may transmit the measured RSSI to the network. In this case, the network may select an AN that is supposed to participate in positioning based on the RSSI information. Needless to say, the network may also determine a measurement mode based on all of the RSRP and the RSSI.

The network according to an embodiment of the present disclosure may also determine the number of predefined RSTD measurement target distributed antennas and the number of RSSI measurements for respective measurement target distributed antennas related with the determined positioning mode.

The network according to an embodiment of the present disclosure may further receive positioning capability information of the vehicle UE. In this case, at least one of the positioning mode, the number of RSTD measurement target distributed antennas, and the number of RSRP measurements for respective measurement target distributed antennas may be determined based on the positioning capability information.

FIG. 24 is a diagram illustrating an OTDOA positioning method according to an embodiment of the present disclosure.

In the OTDOA positioning method, a UE utilizes measurement timings of DL signals received from multiple TPs including an eNB, ng-eNB, and a PRS-dedicated TP. The UE measures the timings of the received DL signals using positioning assistance data received from a location server.

The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell, respectively. That is, the RSTD may be calculated based on a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the time of arrivals (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

where c is the speed of light, {xt, yt} is the (unknown) coordinates of the target UE, {xi, yi} is the coordinates of a (known) TP, and {x1, y1} is the coordinates of a reference TP (or another TP). (Ti–T1) is a transmission time offset between the two TPs, which may be referred to as "real time difference" (RTD), and ni and n1 may represent values related to UE TOA measurement errors.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
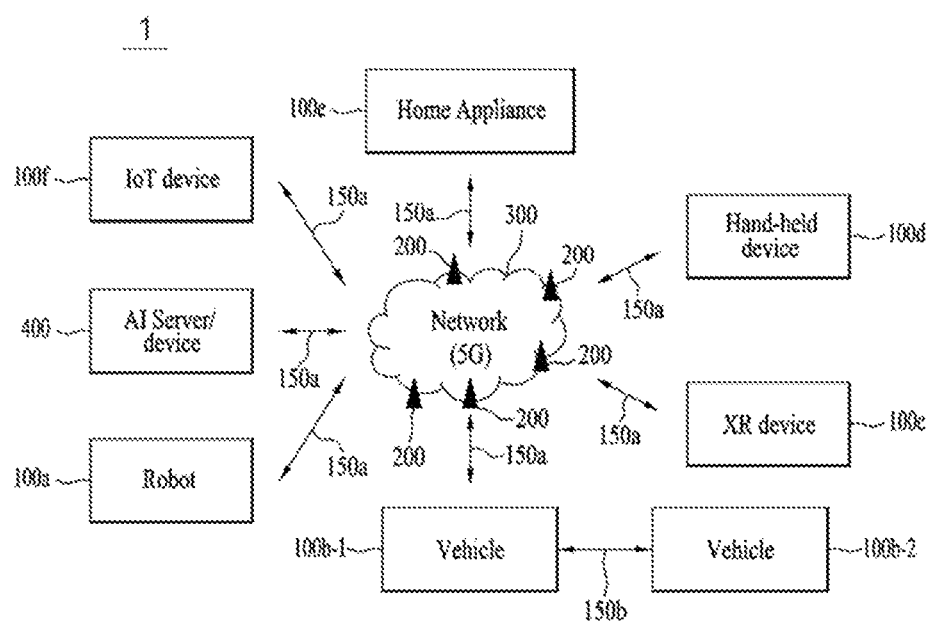
FIG. 25 illustrates a communication system applied to the present disclosure.

FIG. 25 illustrates a communication system applied to the present disclosure.

Referring to FIG. 25, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 26:
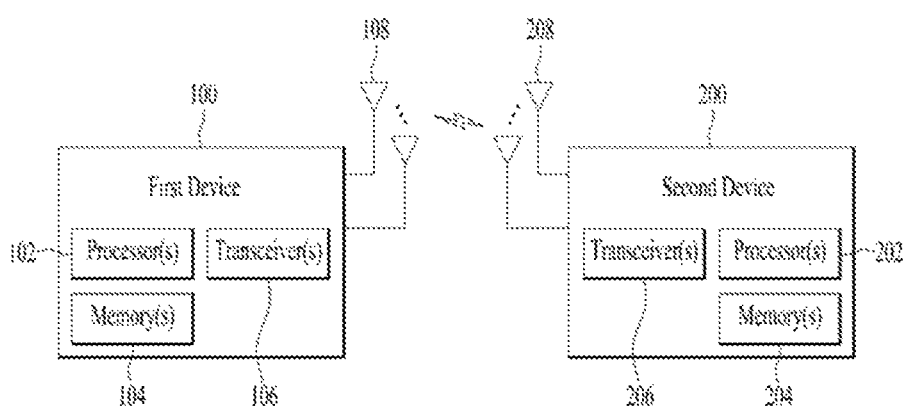
FIG. 26 illustrates wireless devices applicable to the present disclosure.

FIG. 26 illustrates wireless devices applicable to the Present Disclosure.

Referring to FIG. 26, a first wireless device 100 and a second wireless device 200 may transmit radio signals through a variety of RATs (e.g., LTE and NR). Herein, {the first wireless device 100, the second wireless device 200} may correspond to {the wireless device 100x, the base station 200} and/or {the wireless device 100x, the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE or the vehicle may include the processor 102 and the memory 104 that are connected to the RF transceiver. The memory 104 may contain at least one program for performing an operation related to the embodiments described with reference to FIGS. 12 to 23.

The processor 102 may measure a time difference of arrival (TDoA) for each distributed antenna based on a signal received from an anchor node (AN) through a plurality of distributed antennas, may configure a relative position for each distributed antenna based on a preconfigured reference point, and may determine an absolute position that is a position of the reference point based on a TDoA measured for each distributed antenna and the relative position configured for each distributed antenna. The processor 102 may perform the operation for determining an absolute position of the UE according to embodiments for performing the UE-based and(or) network-based positioning described with reference to FIGS. 12 to 23 based on the program contained in the memory 104.

A chip set including the processor 102 and the memory 104 may be configured. In this case, the chip set may include at least one processor and at least one memory operatively connected to the at least one processor and allowing the at least one processor to perform an operation when being executed, and the operation may include measuring a time difference of arrival (TDoA) for each distributed antenna based on a signal received through a plurality of distributed antennas from an anchor node (AN), configuring a relative position for each distributed antenna based on a preconfigured reference point corresponding to the corresponding UE, and determining an absolute position as a position of the reference point based on a TDoA measured for each distributed antenna and the relative position configured for each distributed antenna. The processor 102 may perform the operation for determining the absolute position of the UE according to embodiments for performing the UE-based and(or) network-based positioning described with reference to FIGS. 12 to 23 based on the program contained in the memory 104.

A computer readable recording medium including at least computer program for allowing the at least one processor to perform an operation may be provided, and the operation may include measuring a time difference of arrival (TDoA) for each distributed antenna based on a signal received through a plurality of distributed antennas from an anchor node (AN), configuring a relative position for each distributed antenna based on a preconfigured reference point corresponding to the corresponding UE, and determining an absolute position as a position of the reference point based on a TDoA measured for each distributed antenna and the relative position configured for each distributed antenna. The processor 102 may perform the operation for determining the absolute position of the UE according to embodiments for performing the UE-based and(or) network-based positioning described with reference to FIGS. 12 to 23 based on the program contained in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor 202 may measure a time difference of arrival (TDoA) for each distributed antenna based on a signal received through a plurality of distributed antennas from an anchor node (AN), may configure a relative position for each distributed antenna based on a preconfigured reference point, and may determine an absolute position as a position of the reference point based on a TDoA measured for each distributed antenna and the relative position configured for each distributed antenna. The processor 202 may perform the operation for determining the absolute position of the UE according to embodiments for performing the UE-based and(or) network-based positioning described with reference to FIGS. 12 to 23 based on the program contained in the memory 204.

A chip set including the processor 202 and the memory 204 may be configured. In this case, the chip set may include at least one processor and at least one memory operatively connected to the at least one processor and allowing the at least one processor to perform an operation when being executed, and the operation may include measuring a time difference of arrival (TDoA) for each distributed antenna based on a signal received through a plurality of distributed antennas from an anchor node (AN), configuring a relative position for each distributed antenna based on a preconfigured reference point corresponding to the corresponding UE, and determining an absolute position as a position of the reference point based on a TDoA measured for each distributed antenna and the relative position configured for each distributed antenna. The processor 202 may perform the operation for determining the absolute position of the UE according to embodiments for performing the UE-based and(or) network-based positioning described with reference to FIGS. 12 to 23 based on the program contained in the memory 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Application of Wireless Device Applicable to the Present Disclosure

Figure 27:
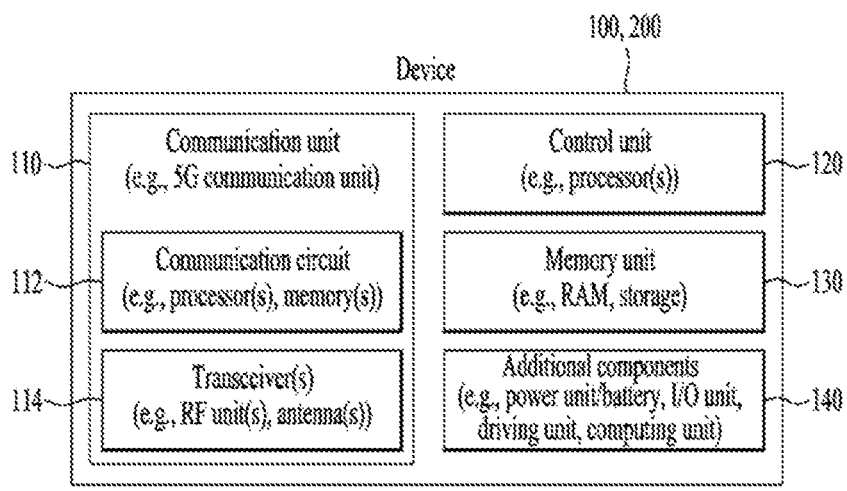
FIG. 27 illustrates another example of a wireless device applicable to the present disclosure.

FIG. 27 illustrates another example of a wireless device applied to the present disclosure. The wireless device may be implemented in various forms according to a use-case/service (refer to FIG. 25).

Referring to FIG. 27 wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a FinTech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 28:
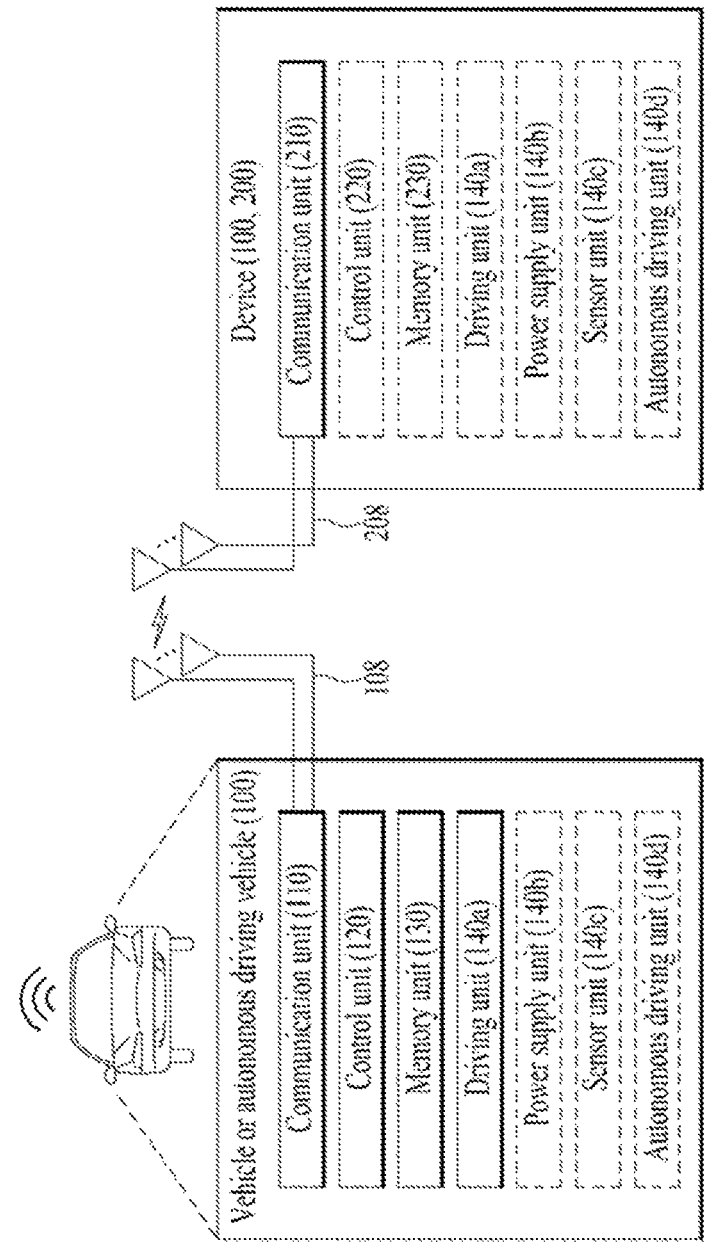
FIG. 28 illustrates a vehicle or an autonomous driving vehicle applied to the present disclosure.

Example of a Vehicle or an Autonomous Driving Vehicle to which the Present Disclosure is Applied FIG. 28 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The antenna unit 108 may include a plurality of distributed antennas distributed and arranged in the vehicle. The position of the distributed antennas arranged in the vehicle may be different depending on the vehicle. A reference point indicating a relative position in the vehicle of the distributed antenna may be predefined and may be recorded and maintained in a memory included in the vehicle. In this case, the reference point may be differently defined according to the vehicle.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, a wireless communication technology implemented in the wireless devices XXX and YYY in the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name Additionally or alternatively, the wireless communication technology implemented in the wireless devices XXX and YYY may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL(non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices XXX and YYY according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) associated with small/low-power digital communication based on various standards such as IEEE 802.15.4 and may be called various terms.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure have been described centering on a data transmission and reception relationship between a UE and a BS. The transmission and reception relationship may be equally/similarly extended to signal transmission/reception between a UE and a relay or between a BS and a relay. In this document, a specific operation described as performed by the BS may be performed by an upper node of the BS as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS), or a mobile subscriber station (MSS) as necessary.

In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Various embodiments of the present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL AVAILABILITY

The above-described embodiments of the present disclosure are applicable to various mobile communication systems.

The invention claimed is:
1. A user equipment (UE)-based positioning method by a UE in a wireless communication system, the method comprising:
measuring a time difference of arrival (TDoA) for each distributed antenna based on a signal received through a plurality of distributed antennas from an anchor node (AN);
configuring a relative position for each of the distributed antennas based on a preconfigured reference point related with the UE; and
determining an absolute position as a position of the reference point based on the TDoA measured for each of the distributed antennas and the relative position configured for each of the distributed antennas by applying a least-square (LS) positioning algorithm, wherein the LS positioning algorithm includes at least one of:
- a first LS positioning algorithm for determining the absolute position by applying a weight average to a position of the reference point measured for each of the distributed antennas; or
- a second LS positioning algorithm for determining the absolute position by combining all the TDoAs measured for the respective distributed antennas.

2. The method of claim 1, wherein the weight is determined based on at least one of a positioning quality indicator (PQI) of a position of the anchor node, quality of a signal received from the anchor node for each of the distributed antennas, a number of the anchor nodes observed for each of the distributed antennas, or a topology of the anchor node observed for each of the distributed antennas.

3. The method of claim 1, wherein the TDoA for each of the distributed antennas is measured based on a single reference anchor node or a multi-reference anchor node.

4. The method of claim 1, wherein the TDoA is measured based on a time of arrival (ToA) for a positioning reference signal (PRS) received from a neighboring anchor node for each of the distributed antennas.

5. The method of claim 1, wherein reference anchor nodes for the respective distributed antennas are identical or different.

6. The method of claim 1, wherein the UE is mounted in the vehicle, and the reference point is configured as a middle of the vehicle or a center point of a front bumper of the vehicle.

7. An apparatus for performing user equipment (UE)-based positioning in a wireless communication, the apparatus comprising:
- a radio frequency (RF) transceiver including a plurality of distributed antennas; and
- a processor connected to the RF transceiver,
- wherein the processor measures a time difference of arrival (TDoA) for each distributed antenna based on a signal received through a plurality of distributed antennas from an anchor node (AN), configures a relative position for each of the distributed antennas based on a preconfigured reference point related with the apparatus, and determines an absolute position as a position of the reference point based on the TDoA measured for each of the distributed antennas and the relative position configured for each of the distributed antennas by applying a least-square (LS) positioning algorithm, wherein the LS positioning algorithm includes at least one of:
- a first LS positioning algorithm for determining the absolute position by applying a weight average to a position of the reference point measured for each of the distributed antennas; or
- a second LS positioning algorithm for determining the absolute position by combining all the TDoAs measured for the respective distributed antennas.

8. The apparatus of claim 7, wherein the weight is determined based on at least one of a positioning quality indicator (PQI) of a position of the anchor node, quality of a signal received from the anchor node for each of the distributed antennas, a number of the anchor nodes observed for each of the distributed antennas, or a topology of the anchor node observed for each of the distributed antennas.

9. The apparatus of claim 7, wherein the TDoA for each of the distributed antennas is measured based on a single reference anchor node or a multi-reference anchor node.

10. The apparatus of claim 7, wherein the TDoA is measured based on a time of arrival (ToA) for a positioning reference signal (PRS) received from a neighboring anchor node for each of the distributed antennas.

11. The apparatus of claim 7, wherein reference anchor nodes for the respective distributed antennas are identical or different.

* * * * *